(12) United States Patent
Biswas et al.

(10) Patent No.: US 8,340,185 B2
(45) Date of Patent: Dec. 25, 2012

(54) SYSTEMS AND METHODS FOR A MOTION COMPENSATED PICTURE RATE CONVERTER

(75) Inventors: Mainak Biswas, Scotts Valley, CA (US); Nikhil Balram, Mountain View, CA (US); Bharat Pathak, Karnataka (IN)

(73) Assignee: Marvell World Trade Ltd., St. Michael (BB)

( * ) Notice: Subject to any disclaimer, the term of this patent is extended or adjusted under 35 U.S.C. 154(b) by 1484 days.

(21) Appl. No.: 11/803,535

(22) Filed: May 14, 2007

(65) Prior Publication Data

US 2007/0297513 A1    Dec. 27, 2007

Related U.S. Application Data

(60) Provisional application No. 60/817,061, filed on Jun. 27, 2006.

(51) Int. Cl.
*H04N 11/04* (2006.01)

(52) U.S. Cl. .................................. 375/240.16
(58) Field of Classification Search ............. 375/240.16
See application file for complete search history.

(56) References Cited

U.S. PATENT DOCUMENTS

| | | | |
|---|---|---|---|
| 6,509,930 | B1 | 1/2003 | Hirano et al. |
| 7,298,781 | B2 | 11/2007 | Nakaya |
| 7,321,626 | B2 | 1/2008 | Sun |
| 7,408,986 | B2 | 8/2008 | Winder |
| 7,920,627 | B2 | 4/2011 | Hubrich et al. |
| 2004/0091047 | A1* | 5/2004 | Paniconi et al. ........ 375/240.16 |
| 2004/0252759 | A1* | 12/2004 | Winder et al. ............ 375/240.12 |

FOREIGN PATENT DOCUMENTS

| | | |
|---|---|---|
| EP | 0 689 359 | 12/1995 |
| JP | 10-145795 | 5/1998 |
| JP | 2000-134585 | 5/2000 |
| JP | 2003-299101 | 10/2003 |
| JP | 2004-173130 | 6/2004 |
| WO | WO 02/37859 | 5/2002 |

OTHER PUBLICATIONS

Kumar et al, "Global Motion Estimation in Frequency and Spatial Doman," IEEE: III-333-336(2004).
Har-noy et al, "A Deconvolution Method for LCD Motion Blur Reduction," Published University of California at San Diego, Dept. of Electrical and Computer Engineering, pp. 1-4, 2006.
Philips Semiconductors Scan Conversion Using The SAA4998 (Falconic-EM), Version 1, Philips Electronics N.V. 2003.
Biswas et al, "Performance Analysis of Motion Compensated De-Interlacing Systems", IEEE: pp. 1-28, 2006.

* cited by examiner

*Primary Examiner* — Aravind Moorthy

(57) ABSTRACT

Disclosed herein are systems and methods for estimating global and local motions between a pair of temporally adjacent frames of an input signal and for applying these motion vectors to produce at least one interpolated, motion-compensated frame between the adjacent frames. In particular, the systems and methods comprise designs for a motion compensated frame rate converter including a global affine motion estimation engine, a global translation motion estimation engine, a segmentation mask generator, an object edge strength map generator and a local motion estimation engine. Combinations of these features are implemented in a motion compensated picture rate converter to accurately and efficiently provide motion estimation and compensation for a sequence of frames.

69 Claims, 20 Drawing Sheets

SYSTEMS AND METHODS FOR A MOTION COMPENSATED PICTURE RATE CONVERTER

This application claims the benefit under 35 U.S.C. §119(e) of U.S. Provisional Application No. 60/817,061 filed Jun. 27, 2006, which is hereby incorporated by reference herein in its entirety.

BACKGROUND OF THE INVENTION

Typical movie films are recorded at 24 Hz, 25 Hz or 30 Hz. Picture rates of common video cameras are 50 Hz and 60 Hz. Commercially available television displays, on the other hand, have picture rates up to 120 Hz, and employ either progressive or interlaced scanning. Hence, to interface broadcast video with a high-end TV display, the original sequence from the broadcast video needs to be up-converted using, for example, a picture rate converter. A picture rate converter typically operates by interpolating image frames at time instances where the frame sequence from a lower-frequency source device has yet to be registered in a higher-frequency destination display.

In simple picture rate converters, a picture is often repeated in the destination display until the next picture arrives from the source device, which often times results in blur and judder when motion occurs. Motion estimation and compensation circuits may be used in a picture rate converter to reduce these unwanted effects and achieve a high performance conversion for moving sequences. Motion compensation operates by estimating where elements of an interpolated picture would be, based on the direction and speed of the movement of those elements. The direction and speed values may then be expressed as motion vectors and are used to "move" the elements to the correct position in the newly interpolated frame. If this technique is applied correctly, its impact may be immediately visible on any picture sequence involving motion, where the resulting pictures can hardly be distinguished from the original sequences before the up-conversion.

It is thus desirable to determine methods and systems that minimize computational cost associated with motion-compensated picture rate conversion while maximizing its estimation accuracy. For example, various motion compensation schemes may be designed and applied to different regions within a sequence of source frames in order to achieve a balance between motion compensation efficiency and accuracy in the resulting interpolated frames. Also, motion compensation schemes themselves may be individually optimized to realize this balance of efficiency and accuracy. In addition, the entire system architecture of a motion-compensated picture rate converter may be designed to enhance its versatility in application and usage by making the architecture compatible with various display devices.

SUMMARY OF THE INVENTION

The present invention relates to systems and methods for estimating global and local motion between a pair of temporally adjacent frames of an input signal and for applying these motion vectors to produce at least one interpolated, motion-compensated frame between the frames.

According to one aspect of the invention, a motion-compensated picture rate converter (MCPRC) is provided to estimate object motions between consecutive frames of the input signal. First, the signal is processed by a processing module of the MCPRC to isolate the essential regions on the frames. Then a motion-compensated frame rate converter (MCFRC) of the MCPRC is used to estimate global motion between any two consecutive frames using a set of affine motion parameters. In addition, the MCFRC estimates local motion between the frames using a set of motion vectors, where each motion vector is either a local motion vector or a modified global motion vector.

In one embodiment, the MCFRC includes a global affine motion estimation engine that generates the set of affine motion parameters via a two-stage process. In particular, a global translation estimation and affine prediction module is provided to produce a coarse level estimation of the parameters before the parameters are refined in an affine parameter refinement module.

In one embodiment, a local motion correction module of the MCFRC is used to generate motion vectors for an area of interest on a current frame by identifying the neighboring areas adjacent to the area of interest on a reference frame. The motion vector for the area of interest may then be computed based on the motion vectors of the neighboring areas computed for the reference frame. The resulting motion vector is a local motion vector.

In one embodiment, the local motion correction module of the MCFRC is used to generate the motion vector for an area of interest on a current frame based on the affine motion parameters computed for the neighboring areas adjacent to the interest area. The resulting motion vector is a modified global motion vector.

In one embodiment, a combination of an edge mask and a segmentation mask is used to determine foreground regions of the current frame for undergoing motion compensation using either a local motion vector or a modified global motion vector. A choice between these two vectors may be based on the estimation errors generated as a result of applying each of the two vectors to the area of interest.

In another aspect of the present invention, a global translation estimation module of the global affine motion estimation engine is provided to estimate a global translation movement between a current frame and a reference frame. This module operates by using a phase-correlation technique to generate a set of affine parameters that coarsely estimate a global translation motion between the frames. The phase-correlation technique first decimates respective ones of the current and reference frames by a specific decimation factor. The resulting decimated current and reference frames are then Fourier transformed. Phases corresponding to the transformed current frame are then subtracted from phases corresponding to the transformed reference frame to generate a phase difference array. An exponential of this phase difference array is then inverse Fourier transformed to generate a correlation surface. A maximum value of the correlation surface and a location of the maximum value on the correlation surface may be utilized to compute the affine parameters related to the global translation motion.

The affine parameters generated from this coarse-level estimation may be further refined in the affine parameter refinement module of the global affine motion estimation engine. This module uses a refinement technique that is based on first updating the reference frame using the affine parameters obtained from the coarse-level estimation. Then a difference between the updated reference frame and the current frame is obtained and is used to refine the affine parameters so as to minimize the difference between the updated reference frame and the current frame.

According to another aspect of the invention, a local motion correction module of the MCFRC is provided for computing a motion vector for an interest area on a current frame. Computation performed in this module is based on a set of global affine motion parameters obtained from the global affine motion estimation module. In particular, a segmentation mask is generated using the affine parameters to identify foreground and background regions of the current frame. Then an object edge strength map is produced for identifying regions of significant edge strengths on the current frame. Subsequently, an appropriate motion estimation scheme is chosen for the area of interest on the current frame based on the foreground, background and significant edge strength regions in relation to the interest area.

In one embodiment, the motion estimation scheme is one of a modified global motion estimation scheme and a local motion estimation scheme.

In one embodiment, the segmentation mask is generated by first updating the reference frame using the affine parameters. Then a difference frame between the updated reference frame and the current frame is obtained. Each region of the difference frame is then compared to a threshold value in order to classify the region into one of a foreground and background regions.

In one embodiment, this segmentation mask is further refined in a second process to generate a final segmentation mask. This process includes first determining objects on the initial segmentation mask having at least two connected regions. Then an area occupied by each identified object is quantified. Subsequently, each quantified area is compared to a threshold value to re-classify each of the connected regions of the object into one of the foreground and background regions.

In one embodiment, the object edge strength map is produced by first generating one or more eigenvalues correlating to vertical and horizontal directions of each region on the current frame. A maximum of the eigenvalues is then determined. Each region having eigenvalues approximately within a range defined by the maximum is classified as having significant edge strengths.

In one embodiment, at least one of a median filter, an edge filter and a Guassian filter is applied to the motion vector produced for the area of interest.

In one embodiment, the motion vectors produced in the MCFRC, each being a global affine motion vector, a local motion vector or a modified global motion vector, are used to generate a motion-compensated frame interpolated between the current frame and the reference frame.

According to another aspect of the invention, the MCPRC includes a post-processing module for processing an output signal of the MCFRC, where the output signal has a frame rate that is higher than a native frame rate of the input signal.

In one embodiment, the post-processing module is positioned between the processing module and the MCFRC to further process a signal from the processing module. In addition, an output signal of the post-processing module is adapted to have a frame rate about equal to a native frame rate of the input signal.

In one embodiment, the processing module comprises circuitry for performing at least one of noise reduction and de-interlacing. The post-processing module comprises circuitry for performing at least one of frame image scaling, enhancement and color management.

DETAILED DESCRIPTION OF THE INVENTION

Figure 1:
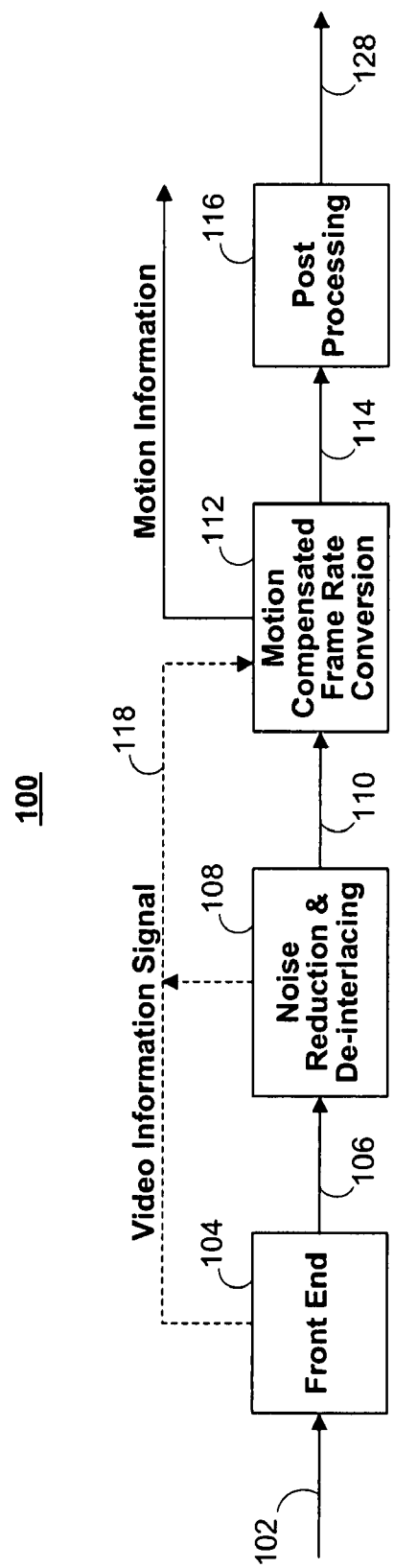
FIG. 1 is an illustrative embodiment of a motion compensated picture rate converter (MCPRC) circuit according to the present invention.

FIG. 1 illustrates a high-level diagram of a motion compensated picture rate converter (MCPRC) circuit 100 in accordance with one aspect of the invention. Input signal 102, having a discrete sequence of video frames, is input to MCPRC circuit 100, which produces an up-converted, motion-compensated output signal 128 via modules 104, 108, 112, and 116 of MCPRC circuit 100. Each of the modules of MCPRC circuit 100 will be described below. Subsequent to the up-conversion, output signal 128 from MCPRC circuit 100 has a frame rate that is typically much higher than the frame rate of input signal 102. For example, input video signal 102 may be produced from a video camera which has a picture rate of 60 Hz. This video signal may need to be up-converted using MCPRC circuit 100 in order to be suitable for output on a LCD panel display having, for example, a refresh rate of 120 Hz. In general, frame rate up-conversion is achieved by injecting a pre-determined number of unique frames between every pair of temporally adjacent input frames. These intermediate frames may be created to approximately capture motion trajectories of objects between frames, thereby enhancing the overall smoothness of a video image sequence as it is displayed after up-conversion.

With reference to FIG. 1, input signal 102 is first processed by a front-end module 104 for down-conversion and demodulation. This front-end module 104 may contain components such as tuners, demodulators, converters, codecs, analog video decoders, etc. An output 106 from front-end module 104 is then passed downstream to a noise reduction and de-interlacing module 108 which converts signal 106 from its native interlace scan-based form to a high quality progressive scan output 110 while realizing a significant reduction in analog noise and compression artifacts such as block noise and mosquito noise. The resulting progressive-scan output 110 is subsequently fed to a motion compensated frame rate conversion (MCFRC) module 112, which generates motion compensated interpolated frames to produce a video output sequence 114. Video output sequence 114 may have a frame rate that is higher than the native frame rate of original input signal 102. MCFRC module 112 will be described below in further operational detail. Up-converted video output 114 is then processed by a post-processing module 116 that applies additional video enhancement functions to video signal 114, such as scaling, edge enhancement, color management, picture controls, etc. that are typically present in a digital video pipeline.

In some embodiments, the entire MCPRC architecture illustrated in FIG. 1 may be implemented on a single chip. In one exemplary structure, this MCPRC chip may be incorporated into television circuitry where the up-converted, post-processed output 128 of the MCPRC chip is transmitted to an external display panel for video However, if post-processing module 116 were decoupled from the process pipeline and built, instead, into the display panel, the usability of MCPRC system 100 would be severely limited. This is because signal 114, as it is transmitted from the chip to the LCD display, occupies a bandwidth that is much higher than the native frame rate of input signal 102. Hence, in many instances, it may not be possible to find a matching high-bandwidth interface through which the television circuitry is able to communicate to the LCD display. However, one advantage of having MCPRC architecture 100 encapsulated in a single chip is that it facilitates the exchange of information among various components of system 100.

Figure 2:
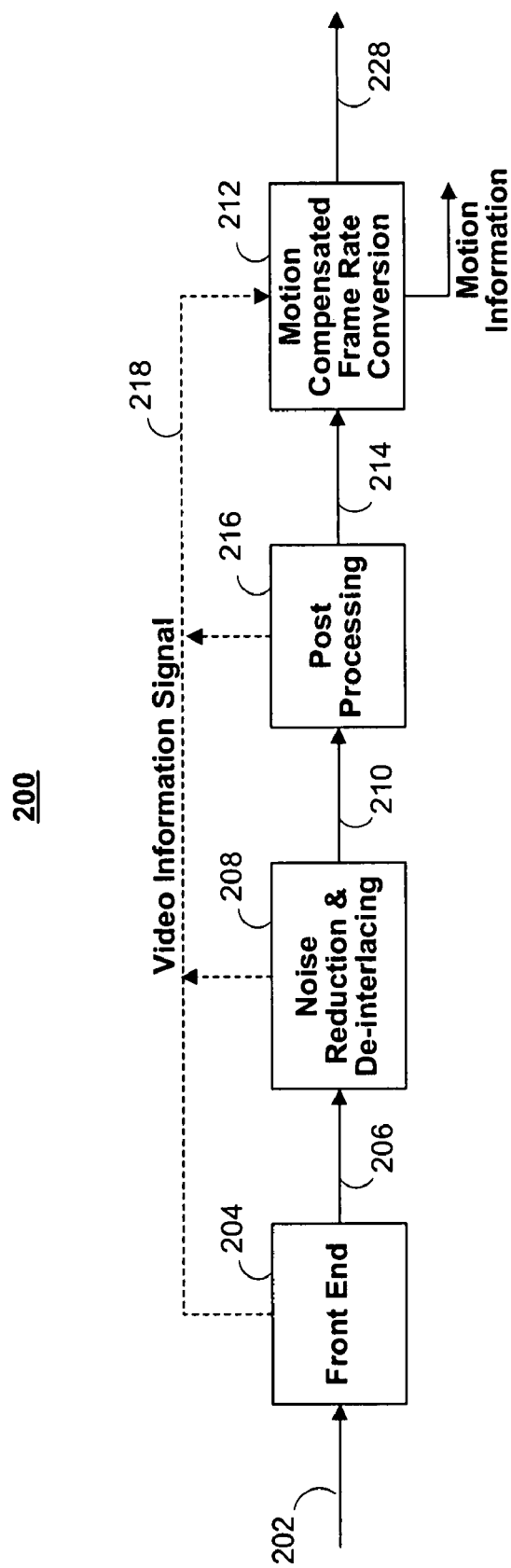
FIG. 2 is another illustrative embodiment of a MCPRC according to the present invention.

FIG. 2 illustrates a high-level diagram of another MCPRC configuration 200, in which the arrangement of MCFRC block 112 and post-processing module 116 of FIG. 1 is transposed so that the post-processing module 216 is applied prior to the video being up-converted to a higher bandwidth at MCFRC module 212 of FIG. 2. By placing the up-conversion function in the last step of the process pipeline, the up-conversion function may be isolated from the remaining circuitry. Accordingly, this arrangement may allow the separation of modules 204, 208 and 216, from MCFRC module 212. In certain embodiments, modules 204, 208, 216 and 212 are structurally similar to their counterpart modules 104, 108, 116 and 112 of FIG. 1. In one exemplary architecture, a chip containing modules 204, 208 and 216 may be integrated into television receiver circuitry and may operate at a native frame rate of input signal 202 while MCFRC module 212 is integrated inside a LCD display panel that is decoupled from the other process units. In this arrangement, transmission signal 214 from the television circuitry to the LCD display panel occupies a native bandwidth that is relatively lower than the up-conversion bandwidth required for the LCD panel display. The television receiver circuitry may be able to communicate with the LCD display via a standard video/display interface such as a low-voltage differential signaling (LVDS) channel. This low-bandwidth interface promotes the versatility of system 200 thereby permitting any number of different display panels to be connected to the television receiver circuitry.

As illustrated in FIGS. 1 and 2, video information signal paths 118 and 218, respectively, are provided to facilitate the transfer of information between the modules in the corresponding MCPRC systems 100 and 200. In particular, information that is conveyed to MCFRC modules 112 and 212 includes, for example, the position of a closed caption display, the presence of an on-screen display, the native frame rate of respective input signals 102 and 202, and the origin and active video boundaries of respective input signals 102 and 202.

In the illustrated MCPRC systems 100 and 200, the input video signals 102 and 202 may range from Standard Definition (NTSC/PAL/SECAM) to High Definition and may be interlaced or progressive-based. In some instances, the video signal resolution is even lower than Standard Definition with low frame rates. For example, the input video signal may be a QVGA (320×240) input at 15 or 30 frames per second from a connector device in a portable media player such as an iPod. In certain instances, the low-resolution video signal may be fed to a video dock in a personal media player or a multimedia cellular phone via a connector device, where the dock may contain an integrated circuit capable of performing spatial and temporal conversions from, for example, 320×160 at 5 fps to 720×480 at 60 fps. Interlaced inputs may be composed of video-originated or film-originated material. Video-originated material may be first de-interlaced and converted from a field rate to a frame rate before being input to MCFRC modules 112 and 212. Film-originated material is converted to its original progressive format for input to MCFRC module 112 and 212.

Figure 3:
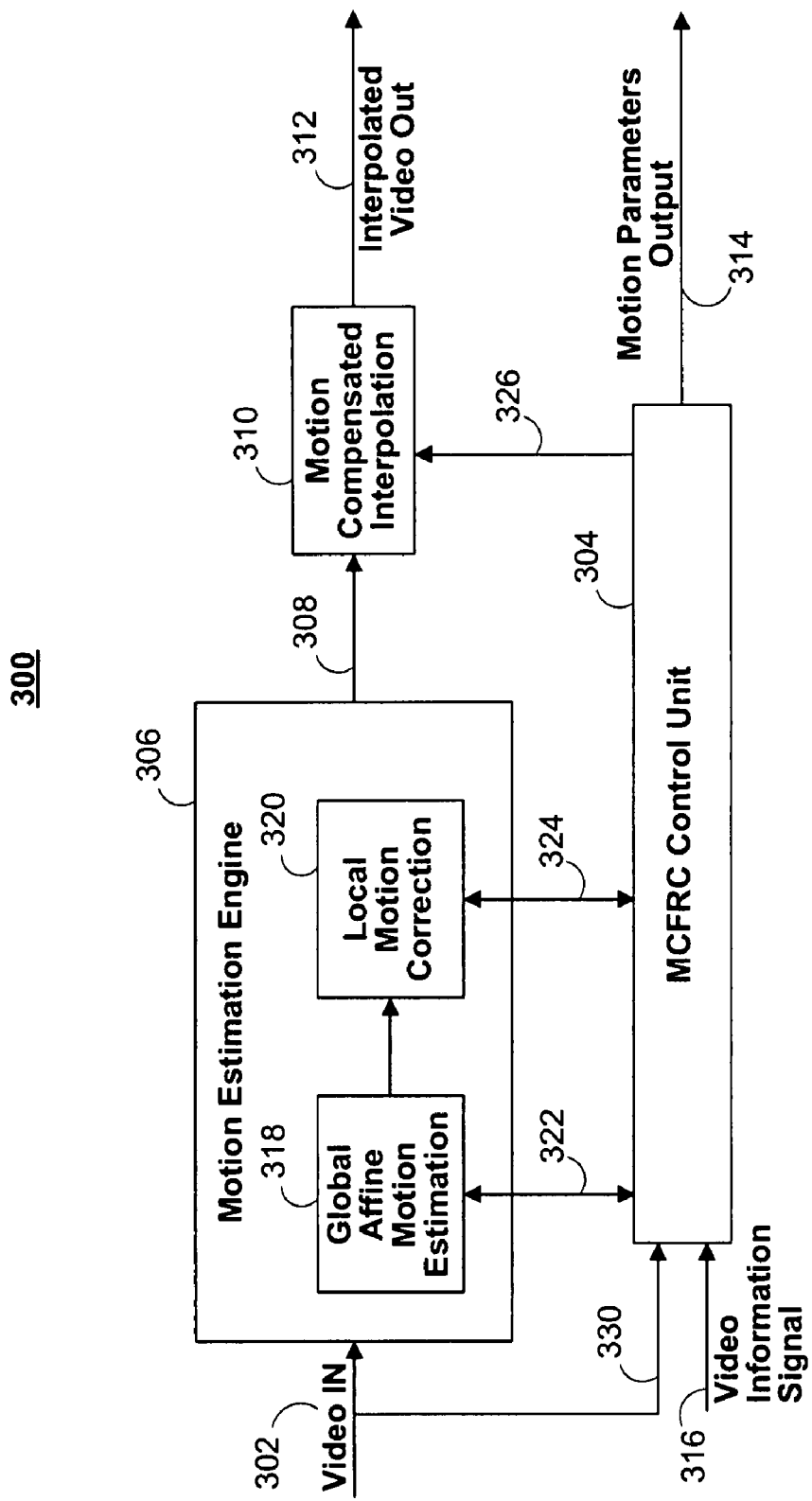
FIG. 3 is an illustrative block diagram of a motion compensated frame rate converter (MCFRC) module of FIGS. 1 and 2.

FIG. 3 illustrates an exemplary implementation 300 of MCFRC modules 112 and 212 of FIGS. 1 and 2, respectively, for providing object motion estimation between pairs of consecutive frames in an input video signal 302. For each pair of consecutive frames to be interpolated, the earlier of the two frames is referred to as a "reference frame," and the latter of the frames is referred to as a "current frame." According to the illustrative embodiment of MCFRC module 300 in FIG. 3, input signal 302 is processed by a MCRFC control unit 304 in preparation for motion compensation in motion estimation engine 306 and motion interpolation in motion compensated interpolation module 310. In particular, motion estimation engine 306 produces global and local motion compensation information for each pair of consecutive frames in an input sequence 302 using the processed frame information transmitted from MCFRC control unit 304 via links 322 and 324. The resulting global and local motion compensation information is then forwarded to motion compensated interpolation module 310 via link 308 as well as to MCFRC control unit 304 via links 322 and 324. In some instances, a decision to perform motion compensated interpolation may be sent from control unit 304 to motion compensated interpolation module 310 along with video input signal 302 and any additional video information of the input obtained through video information signal 316. Based on the data obtained from MCFRC control unit 304 and motion estimation engine 306, motion compensated interpolation may be performed at motion compensated interpolation module 310 in order to generate a sequence of video images at a desired frame rate, where the sequence is composed of interpolated frames temporally interspersed among a sequence of original video frames. In some instances, MCFRC control unit 304 may send a control signal to motion compensated interpolation module 310 via link 326 to forgo interpolation of a portion of the video signal. Further, video frame information from motion estimation engine 306, video information signal 316, and video input 302 may also be forwarded to other processing blocks via output 314 for further processing. The operation of motion estimation engine 306, motion compensated interpolation module 310, and MCFRC control unit 304 will be described below in greater details.

MCFRC control unit 304 of FIG. 3 processes each frame of an input video signal 302 by attempting to eliminate certain frame features that may affect the quality of motion prediction and subsequent video interpolation. This signal processing is particularly important to global affine motion estimation functional module 318 where only a "true" image should be used as a basis for global motion estimation. For example, if input video signal 302 is a DVD, which includes features such as pillar boxes and subtitles, MCFRC control unit 304 preferably eliminates the pillar boxes from each DVD frame as well as identifying those regions where the subtitles merge with the frame before the frame is sent to motion estimation engine 306. In instances where input signal 302 is a broadcast video signal, MCFRC control unit 304 preferably identifies static channel logos and ticker symbols associated with each video frame, where the ticker symbols often times roll with a constant velocity that is in a completely opposite direction in comparison to the rest of the scene in the frame. The processed sequence of frames is then forwarded to motion estimation engine 306 via links 322 and 324 for local and global motion estimations.

In another embodiment, input video signal 302 and additional information about input video signal 302 is transmitted to MCFRC control unit 304 via inputs 316 and 330, respectively. In particular, video information signal 316 provides additional information about input video signal 302 such as, for example, synthetic information that should be added to the video or information of the video's origin that may influence the accuracy with which motion vectors are estimated. For example, if the input signal is known to be a computer graphics signal, the signal is likely to have a much sharper transition in both horizontal and vertical directions in comparison to a video-originated signal. Motion vectors associated with the graphics-originated video inputs are typically predicted more accurately once this information is provided to motion estimation engine 306. However, if the video origin is not provided to motion estimation engine 306, the resulting motion vectors may be incorrectly predicted due.

According to yet another embodiment, "scene-cut" detection circuitry may be provided to determine whether to disable motion compensated interpolation module 310 for particular frames within a video signal. Motion compensated interpolation systems may be unable to provide accurate motion estimation during scene changes. Thus, motion compensated interpolation of input signal 302 may be suspended whenever these adverse effects would dominate the resulting up-converted video sequence. This decision to temporarily suspend interpolation may be determined in MCFRC control unit 304 based on an analysis of global and local motion information received from motion estimation engine 306 via links 322 and 324. MCFRC control unit 304 may enable and disable motion compensated interpolation module 310 via communication link 326. If a decision is made to perform interpolation, MCFRC control unit 304 forwards input video signal 302 from channel 330, optional video information signal from channel 316, global motion signal from link 322, and local motion signal from link 324 to motion compensated interpolation module 310 to prepare for motion-compensated interpolation. Otherwise, the information may be selectively forwarded to a subsequent stage via output 314. It should be understood that any other criteria may also be used by MCFRC Control Unit 304 to enable and disable motion compensated interpolation.

Figure 4:
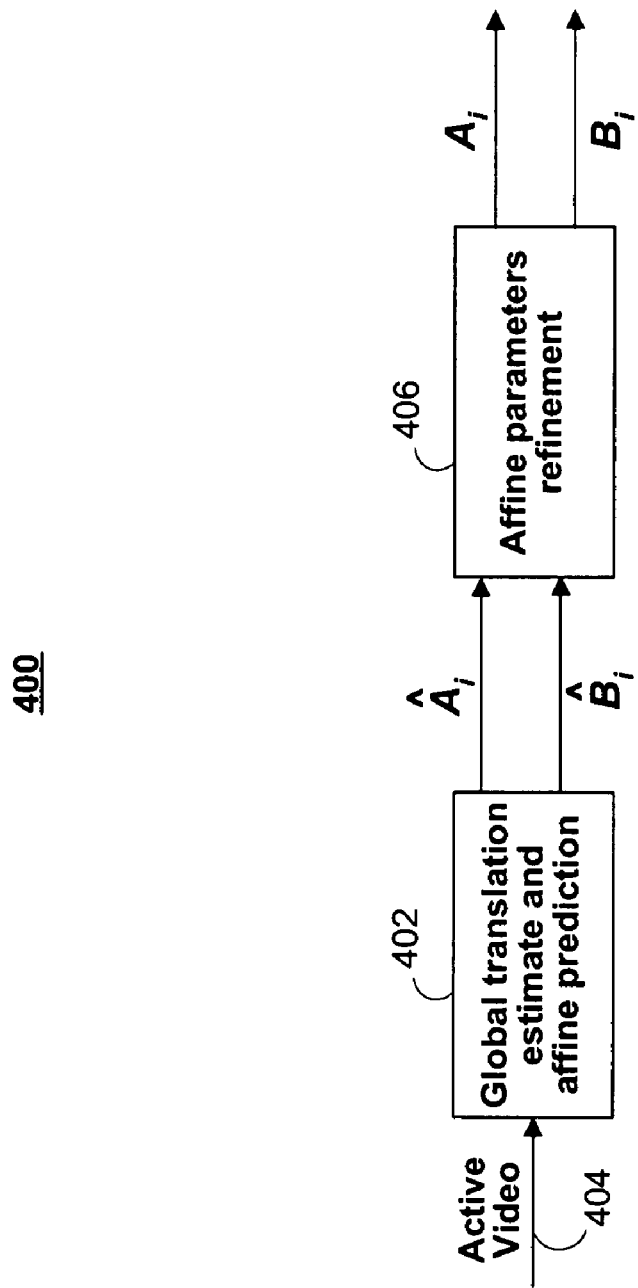
FIG. 4 is an illustrative block diagram of a global affine motion estimation function of FIG. 3.

FIG. 4 provides an exemplary implementation 400 of a global affine motion estimation module 318 of motion estimation engine 306 as depicted in FIG. 3. Global affine motion generally refers to the motion of pixels in the background of a video sequence, which is commonly induced by camera motion such as zoom, pan or rotate. In some implementations, it may be assumed that the background pixels in a video frame sequence are all subjected to a single common global motion. Global affine motion estimation usually provides modeling of background motion using a few basic parameters. In particular, the affine model uses only six affine parameters to represent a global motion trajectory between a given pair of frames. Two of the affine parameters are scaling parameters used to capture a zoom motion of a camera, two are rotation parameters, and two are translation parameters used to capture a panning motion. These six affine parameters provide a great deal of flexibility in terms of global motion prediction.

As illustrated in FIG. 4, global affine motion estimation module 400 is a two-stage process, where first stage 402 provides a rough estimation of a set of affine parameters that are used to capture a global motion between any pair of frames at a coarse resolution. More specifically, the first stage estimates two affine translation parameters related to a global translation movement using a phase-correlation scheme, which will be described in detail with respect to FIGS. 5-7. The first stage also predicts the four remaining affine parameters that are related to global rotation and scaling motions. These predictions are based on the corresponding affine values computed from past estimates, such as from pervious pairs of frames. The resulting affine parameters are then passed onto a second stage 406 for refinement at a finer image resolution level.

In particular, according to the embodiment in FIG. 4, an active video input signal 404 having a sequence of frames is supplied to stage 402 of global affine motion estimation module 400. In certain embodiments, all non-essential video information such as subtitles, OSD menus, etc is removed from active video input signal 404 before being supplied to global affine motion estimation module 400. In stage 402, only the two affine translation parameters pertinent to a global translation or panning movement are estimated. The reason for isolating the global translation motion is that camera motion is predominantly translatory in nature, and large translation ranges are typically difficult to capture. Most of the commercially available motion estimation tools have a very limited measuring range and may often produce incorrect motion measurements when the motion is outside of the permitted range. In comparison, the global translation estimation technique of the present invention is capable of accurately measuring a translation motion range up to half of a picture size of an input frame. This global translation estimation is achieved by using a phase-correlation scheme that is applied to each pair of coarsely-represented frames. Details of the phase-correlation scheme will be described below with respect to FIG. 5. Coarse translation estimate $\hat{A}_i$ including the two coarsely-estimated affine translation parameters is provided by module 402. In addition, a coarse estimate $\hat{B}_i$ of the four remaining affine parameters, which includes two affine rotation parameters and two affine scaling parameters, is computed based on past estimates of these parameters from previous frames.

These coarse-level affine parameter estimates $\hat{A}_i$ and $\hat{B}_i$ are then transmitted to RANSAC based affine parameter refinement module 406 for further refinement. This refinement is accomplished by first using the coarsely estimated affine parameters from stage 402 to motion compensate the reference frame image. The difference between the compensated reference frame and the current frame thus measures the amount by which the coarsely estimated affine parameters need to be adjusted in order to bring the compensated reference frame image into approximate alignment with the current frame image. In one embodiment, a RANSAC-based technique is employed to provide such refinement. This RANSAC-based method 406 operates by first selecting a predetermined number of randomly-located blocks of pixels from the current frame represented at its finest resolution. These blocks also have corresponding counterpart blocks in the compensated reference frame. A segmentation mask is then applied to the motion-compensated current frame to differentiate the foreground and background regions of the frame image. Only those blocks belonging to the background regions of the frame are used to refine the affine parameters related to global motion prediction. This is because it is assumed that only movements of background pixels are subjected to global motion as approximated by the affine parameters. Refined translation estimate $A_i$ and prediction estimate $B_i$ are consequently produced from affine parameter refinement stage 406. Computation of the segmentation mask will be described below.

Figure 5:
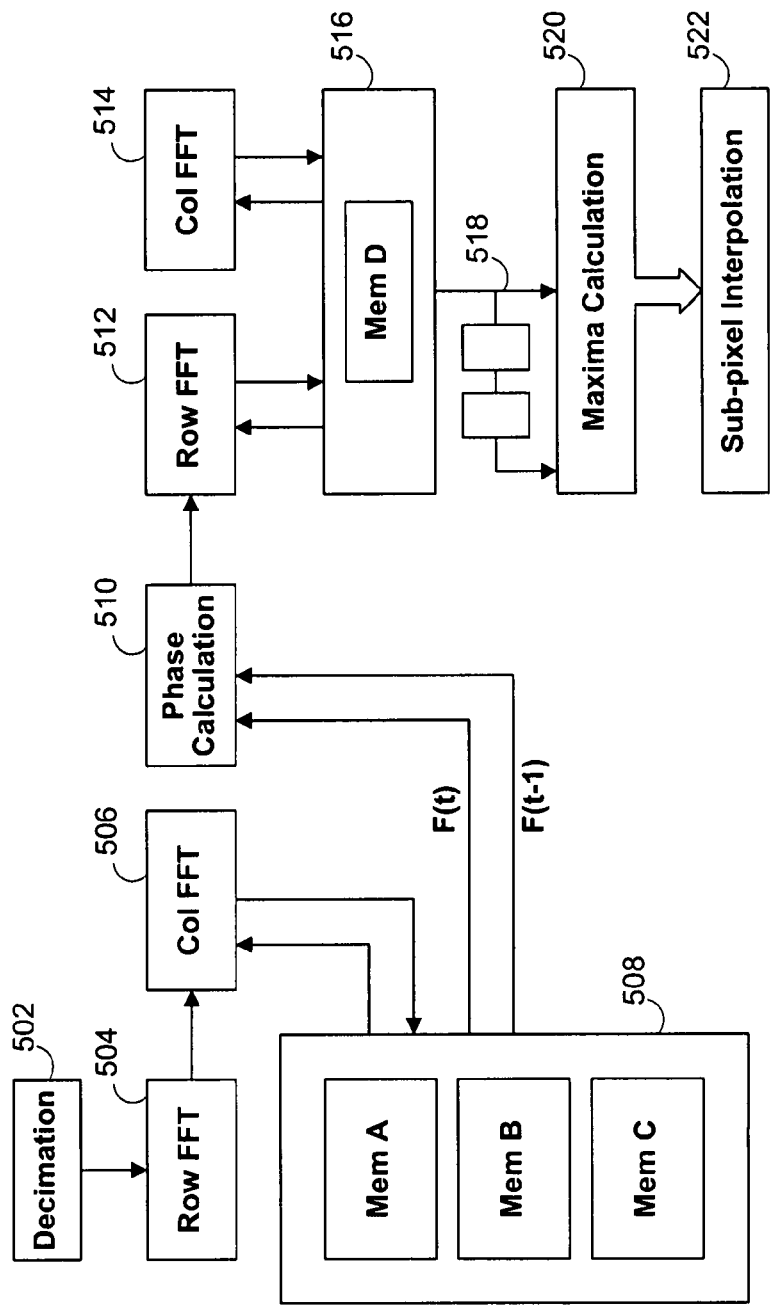
FIG. 5 is an illustrative implementation of a global translation estimation function of FIG. 4.

FIG. 5 illustrates an exemplary block diagram implementation 500 of phase correlation technique. A phase correlation technique is implemented in global translation estimate and prediction stage 402 of FIG. 4 to provide a coarse-level prediction of the affine parameters related to a global translation movement between two consecutive frames. Phase correlation measures this translation motion by utilizing a Fourier shift property which provides that there is only a phase difference between a translated image and its reference image, both of which are represented in a Fourier domain. Moreover, an inverse Fourier transformation of an exponential of this phase difference would produce a correlation surface, from which a measurement of the translation motion between the two image frames can be obtained. An example illustrating this operation will be provided below.

It is known that Fourier transformation of standard definition television images is considered to be prohibitively expensive for most applications. To reduce the complexity of such operation, the reference and current frames are each represented at a coarse resolution level where the images are down-sampled by a pre-determined factor before Fourier transformation is performed. This down-sampling is achieved via decimation module 502 as illustrated in FIG. 5 for decimating each image in both of its horizontal and vertical directions. In one embodiment, the decimation of the images is accomplished using a poly-phase separable filtering method. The resulting decimated image frames are each fast-Fourier transformed (FFT) in both the vertical and horizontal directions. This 2D FFT is realized through applying two consecutive 1D FFT operations, where a decimated image typically undergoes a row FFT operation via module 504 before undergoing a column FFT operation via module 506. FFT results corresponding to the reference and current frames are each represented as a 2D complex data array and are placed in memory 508 for temporary data storage. Subsequently, a 2D array of phase differences is generated from the two complex data arrays. An element-wise exponential of the phase-difference array is then taken to generate a matrix that may then be 2D inverse fast Fourier transformed (IFFT) via a 1D row IFFT operation 512 followed by a 1D column IFFT operation 514. Memory block 516 may be used for temporary data storage during these column 514 and row 512 IFFT operations. From such 2D IFFT operation, a normalized correlation surface, also represented as a 2D data array, is subsequently generated at output 518 and supplied to a maxima calculation module 520. Maxima calculation module 520 operates by determining the value and location of the maximum of the correlation surface array as well as a few of the maximum value's neighboring values. Finally, sub-pixel interpolation module 522 may be used to interpolate the maximum value and its neighboring values in order to produce a global translation estimation. The details of the 2D FFT operation as well as the phase difference calculation will be discussed below.

Figure 6:
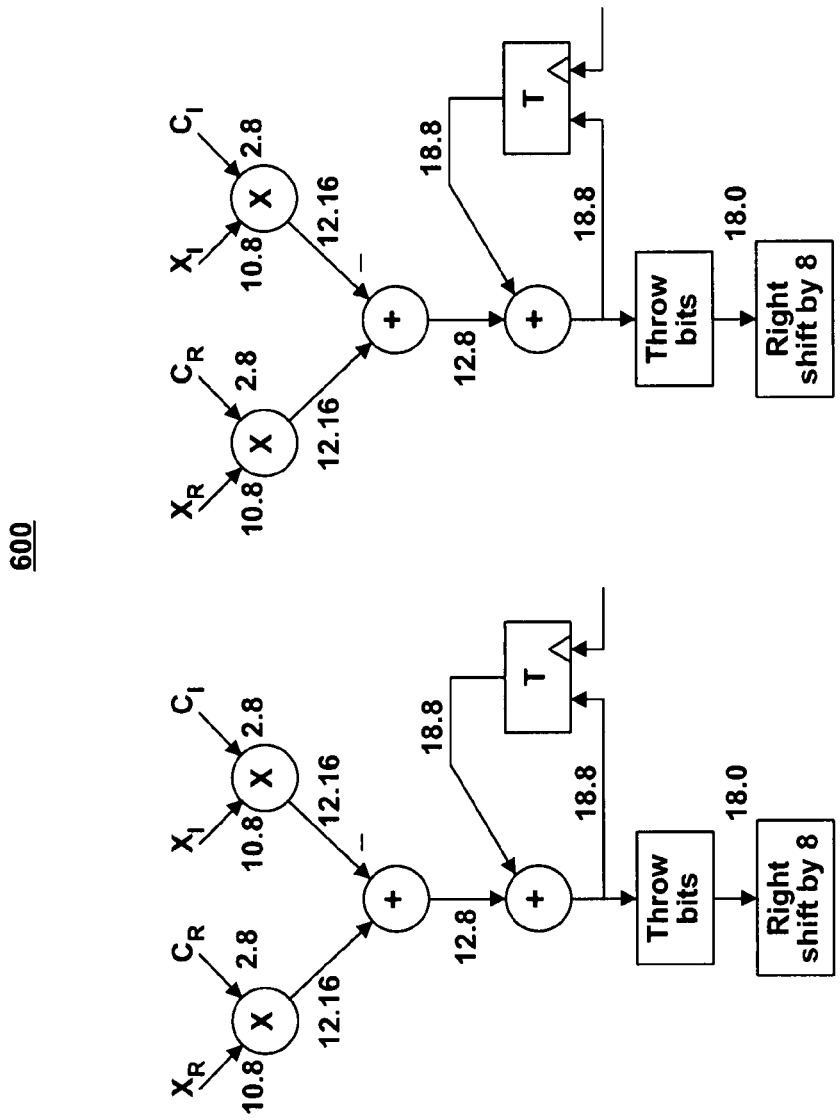
FIG. 6 is an illustrate implementation of a fast Fourier transformation (FFT) function of FIG. 4.

The output of each Fourier transformation of FIG. 5 is a 2D array of complex numbers. The number of bits that may be required to store the floating point representation of each complex number must be carefully considered, because quantization effect due to finite-precision arithmetic directly contributes to the accuracy of the resulting motion estimation. In one embodiment, a 192 bit floating point FFT may be used in module 504 for implementing a row FFT operation and a 128 bit floating point FFT is used in module 506 for implementing a column FFT operation. FIG. 6 shows an exemplary 256× 256 bit 2D FFT design 600. Exemplary Bit precisions used at each step of design 600 is also provided. It is observed that a row FFT implementation may be substantially identical to a column FFT operation, where an input frame, after being transformed by an 1D FFT operation in one direction, is transposed (rotated 90 degrees) and similarly transformed in a second direction using the same 1D FFT operation. A 2D IFFT operation may be similarly implemented using two substantially identical 1D IFFT operations.

Figure 7:
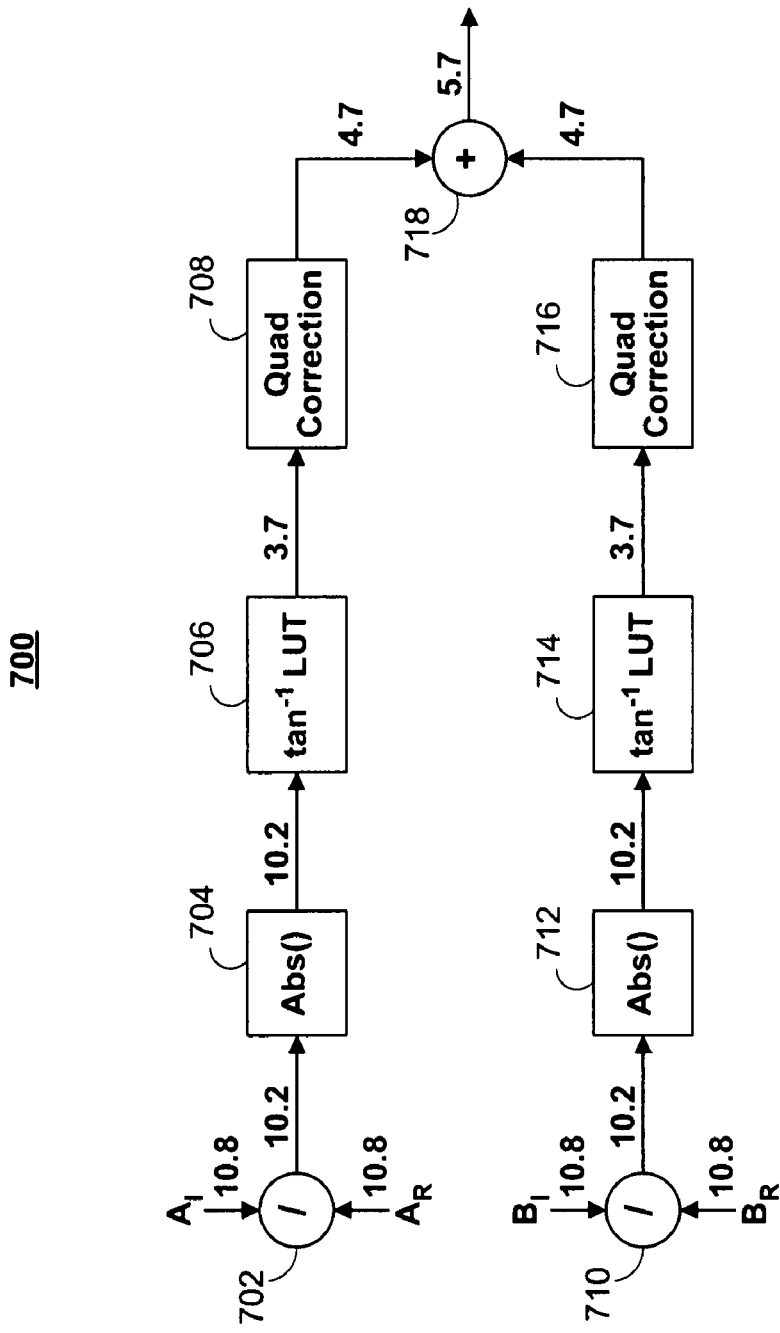
FIG. 7 is an illustrative block diagram of a phase calculation function of FIG. 5.

FIG. 7 provides an exemplary block diagram 700 of a phase difference calculation module 510 of FIG. 5. A pair of complex values, obtained from corresponding elements in two complex data arrays, are supplied as inputs 702 and 710 to exemplary phase difference calculation module 700. In one embodiment as illustrated in FIG. 7, inputs 702 and 710 are taken, respectively, from the two complex data arrays representing the decimated reference and current image frames in the Fourier domain. The real and imaginary parts of inputs 702 and 710 are separated and divided. Phases associated with complex inputs 702 and 710 are then determined from the quotient of the imaginary and complex portions of the input signals using arctan lookup tables 706 and 714, respectively, based on the magnitude of the quotients obtained at operations 704 and 712, respectively. The two phases, after being refined at quadrature correction modules 708 and 716, are subsequently subtracted from each other via adder 718 to generate a phase difference 718. Similarly, this operation can be applied to every pair of corresponding elements in the current and reference FFT data arrays in order to produce a 2D array of phase differences.

After global motion estimation is performed in accordance with the exemplary implementations of FIGS. 5-7, affine motion values may be assigned to the appropriate pixels for global motion compensation. Pixels belonging to the foreground of a frame should be distinguished from those in the background using, for example, a segmentation mask. The pixels belonging to the background may be assumed to be subjected to a single global motion as approximated by the six affine parameters described above. Foreground pixels, on the other hand, do not move by the same global motion. For such pixels, appropriate local motion vectors or modified global motion vectors may be determined.

Figure 8:
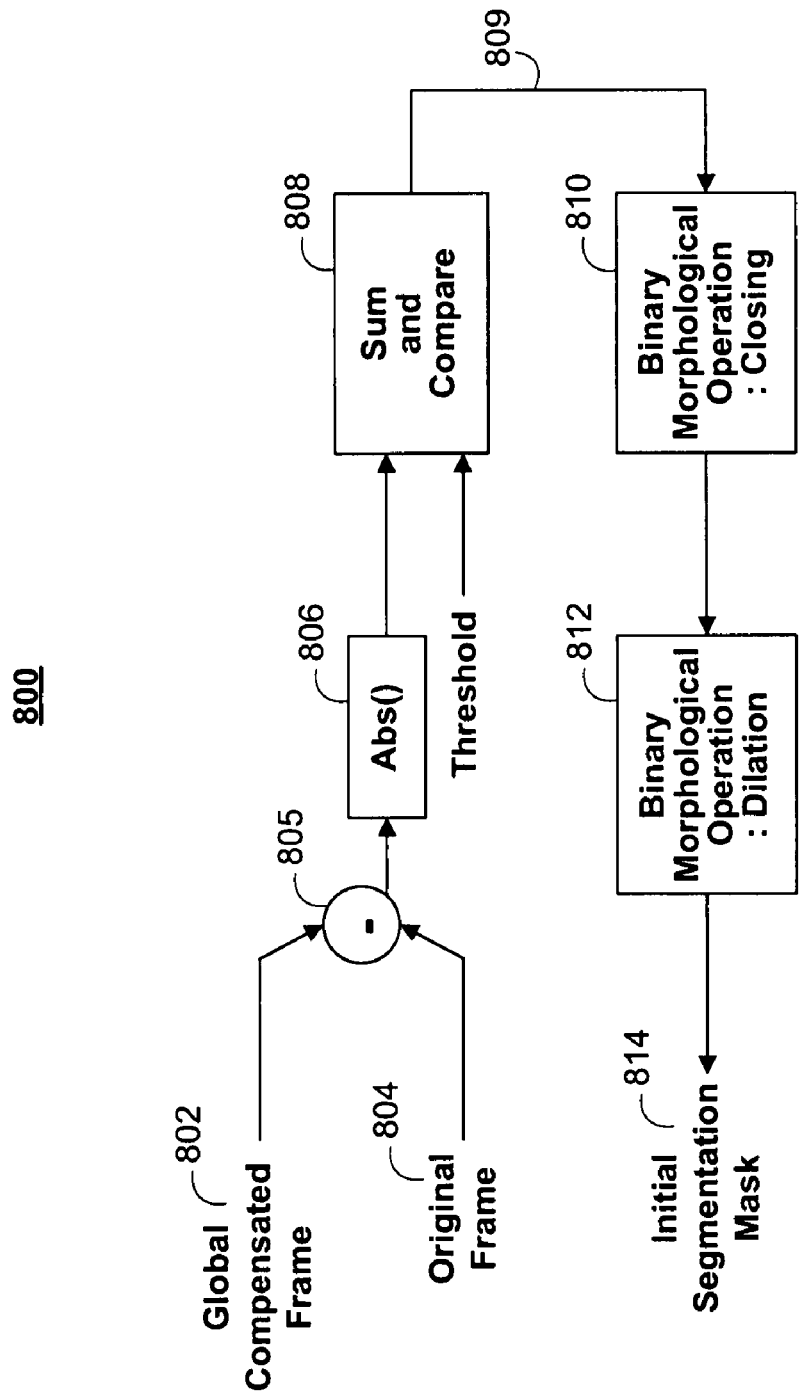
FIG. 8 is an illustrative block diagram for computing an initial segmentation mask.

FIG. 8 provides an illustrative approach to computing an initial version of a segmentation mask. According to the depiction, a global-compensated frame 802 and an original frame 804 are supplied as inputs to system 800. Per-pixel absolute differences between the two input frames are then computed at adder operation 805 and absolute value operation 806. The resulting array of per-pixel absolute differences is supplied to a sum and compare module 808 where the absolute differences are added up for blocks of pixels and compared to a threshold value 807. If a block sum of absolute differences is greater than the threshold, the entire block of pixels may be classified as belonging to the foreground of a frame. Otherwise, the block may be classified as belonging to the background of the frame. Module 808 generates a single bit binary output for each block of pixels within the frame to provide this information, and the collection of these outputs forms a segmentation map 809 that potentially distinguishes the foreground blocks from the background blocks in a frame. Due to the presence of noise and isolated motion areas, it is possible that segmentation map 809 may include erroneously classified block areas. Hence segmentation map 809 is subjected to binary morphological operations such as closing 810 followed by dilation 812 to produce a more homogenous initial segmentation mask 814.

Figure 9:
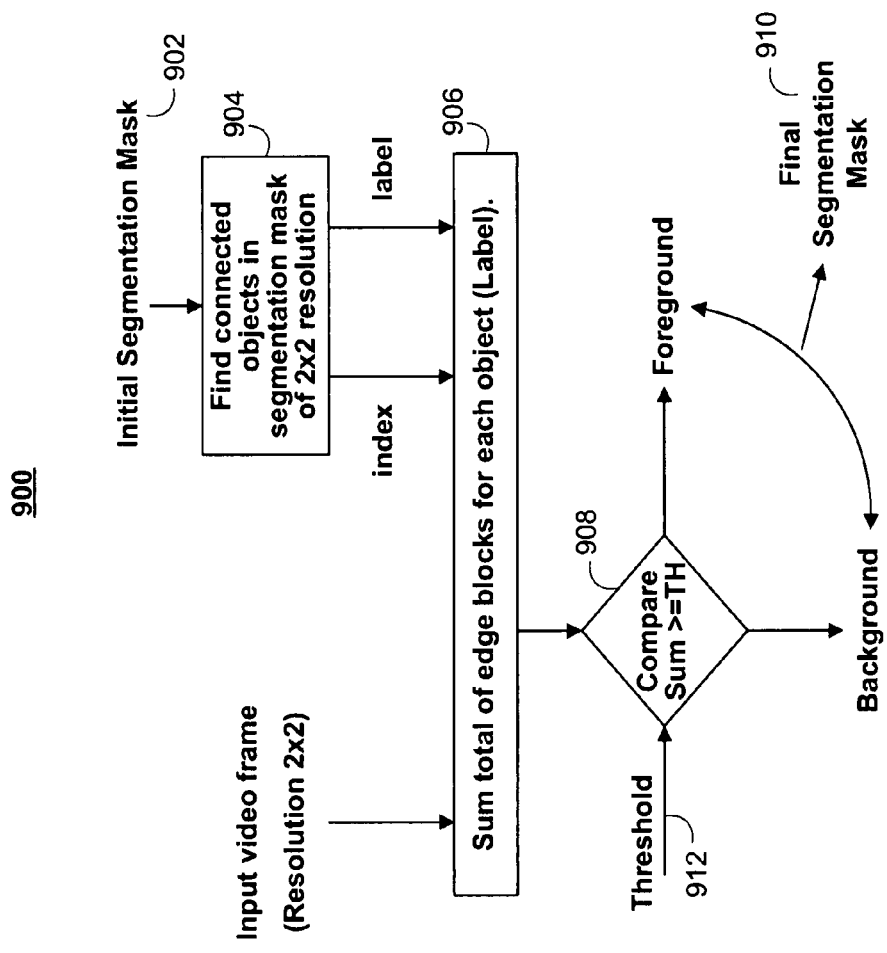
FIG. 9 is an illustrative block diagram for computing a final segmentation mask.

FIG. 9 illustrates an exemplary approach 900 to computing a final segmentation mask based on initial segmentation mask 902 obtained from the process of FIG. 8. Segmentation mask 902 provides a map according to which appropriate compensation schemes may be applied to individual pixels of an image frame. System 900 operates by detecting various connected objects in initial segmentation mask 902, from which pixels may be re-classified for receiving a particular correction treatment. In one implementation, a connected-component analysis 904 is utilized in module 904 to identify the connected objects. In particular, a small object may be viewed as being a part of a larger object if the two objects are separated by only a few pixels. In the illustrated embodiment of FIG. 9, a 2×2 resolution block size is utilized in the connected-component analysis so as to reduce the overall cost of object-connection identification. However, other resolution sizes are possible, such as 3×3, 4×4, etc. At the conclusion of the connected-component analysis, module 904 outputs a list of labels identifying all the connected objects from initial segmentation mask 902, where each object corresponds to a index that specifies the location of the object within the frame. The lists of indices and labels are then supplied to module 906 from which the number of edge blocks per object is computed. If an object is small as determined by comparing the number of blocks in the object with a pre-determined threshold value 912, then the object's blocks may be classified as belonging to the background of an image frame. These background blocks may be compensated using the global affine motion estimation parameters as described above. However, if the number of blocks associated with an object is large, then those blocks may be classified as belonging to the foreground of the image frame and are subjected to a local motion correction approach that may be more accurate than the global motion compensation scheme.

According to another aspect of the present invention, a procedure for the robust generation of an object edge map for an input frame is provided for the purpose of identifying those objects in the frame that have significant edge strengths. Lack of edge strength associated with an object signifies that the contrast between the object and its immediate surroundings is faint. Hence global motion compensation may be applied to the pixels in the object even if the object is in the foreground of the input frame as indicated by a segmentation mask. This is because results produced from applying a more accurate compensation scheme to an object of little edge strength is likely to be identical to those produced from applying a global motion compensation method, and the global motion compensation technique is likely to be the more cost effective of the two methods. Hence, in the interest of computational efficiency, a robust object edge map generation technique is provided for detecting objects having strong edge strengths. According to this method, for every pixel block in a given image frame, two eigenvalues are generated, where the eigenvalues each corresponds to a measure of the horizontal or vertical directions of the block. For example, assuming a SDTV resolution standard is used in conjunction with a 2×2 block size, then a total of 360 blocks in the horizontal direction and 288 blocks in the vertical direction are produced for each SDTV image frame. The maximum value (ev_max) of all the eigenvalues is then determined. Those blocks whose eigenvalues lie within a pre-defined range as measured by the maximum value, for example, within the range [0.8*ev_max, ev*max], may be identified as having significant edge strengths and are thus likely to require a more rigorous motion compensation than the global motion correction technique. These blocks may be assigned a value of 1 to distinguish them from the remaining blocks which may be assigned a value of 0. Consequently, an object edge map is produced where the blocks of 1's unequivocally distinguish those objects having significant edge strengths in an image frame. Moreover, due to the usage of blocks of 1's and 0's, the object edge map itself is fairly immune to noise pollution. Even though a 2×2 block size is utilized in this embodiment of any other block sizes are possible, such as 4×4.

Figure 10:
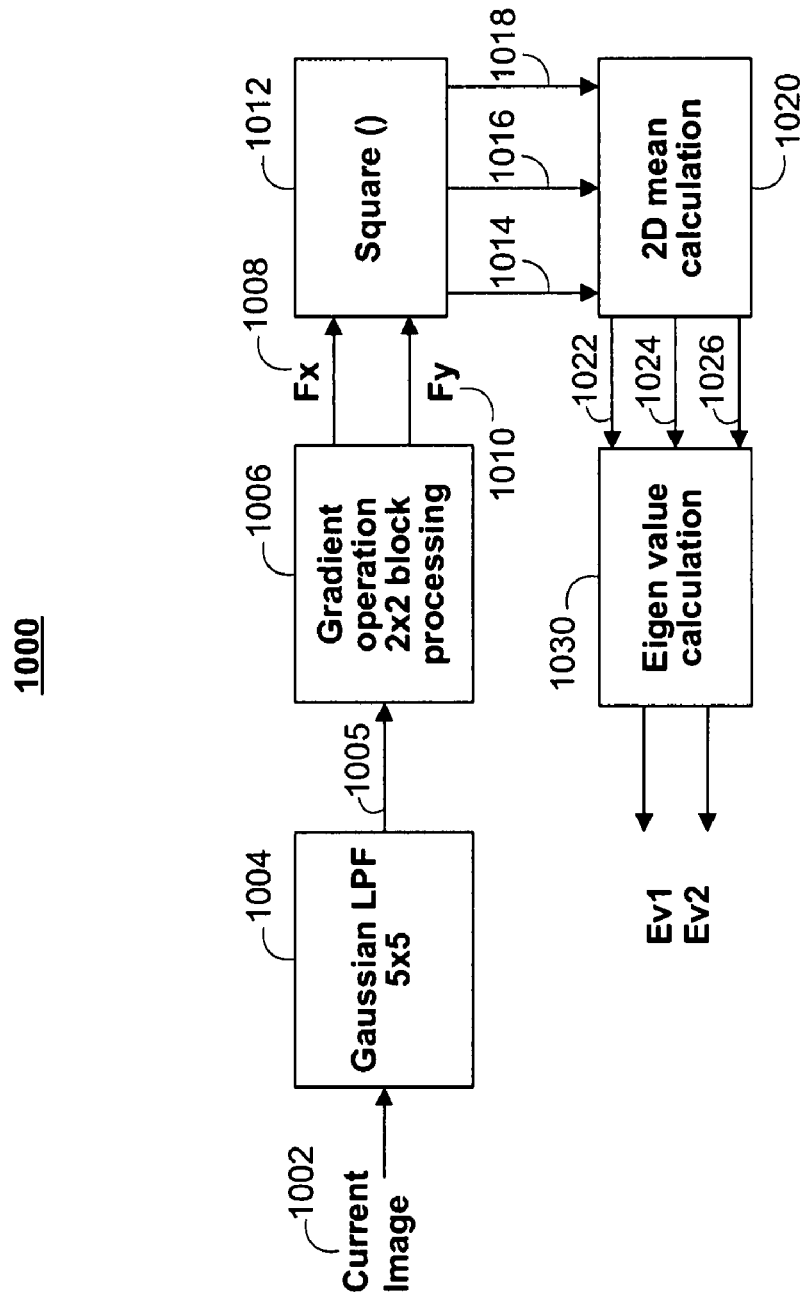
FIG. 10 is an illustrative block diagram for computing an object edge map.

FIG. 10 illustrates a process 1000 in which a pair of eigenvalues associated with each block of pixels in an input frame 1002 are computed. Each eigenvalue corresponds to a measure of the vertical or a horizontal direction of its block and is computed from the block's pixel values which are represented in a luma or intensity domain. Assuming a 5×5 block size is used, the pixel intensity values of frame 1002 are first filtered by a two-dimensional Gaussian filter 1004 of a 5×5 window size. The main purpose of applying Gaussian filter 1004 is to smooth out noise and isolate those small objects in each block so as to eliminate them as candidates for eigenvalue computation. This is because it is more cost-effective to only subject those large objects with significant edge strengths for this more rigorous compensation treatment. For a Gaussian filter of block size of 5×5, four line buffers each of size 720×8 bits may be used to support such filter size. These line buffers may be implemented in SRAM's. In another embodiment, Gaussian filter 1004 may employ a smaller block size, such as 3×3, for the sake of minimizing silicon area usage. Consequently, a reduction of 50% in the size of line buffer hardware is achieved in comparison to the 5×5 block size.

A filtered 2D intensity value array 1005 from Gaussian filter 1004 is supplied to a gradient operation module 1006 for evaluating the gradient of the intensity values in array 1005. In one embodiment, the gradient is computed based on obtaining first-order differences between neighboring intensity values, in both horizontal and vertical directions, of array 1005. This first order difference calculation may be applied on a block basis. For example, consider the following 2×2 block of data array 1005, where the block consists of intensity values A, B, D and E with intensities C and F being its right-side neighbors and intensities G and H being its bottom-side neighbors:

$$\begin{bmatrix} A & B & C \\ D & E & F \\ G & H & I \end{bmatrix}.$$

First-order difference gradient in the horizontal and vertical directions of the block may be calculated as:

$$F_x = \begin{vmatrix} A-B & B-C \\ D-E & E-F \end{vmatrix} \text{ and } F_y = \begin{vmatrix} A-D & B-E \\ D-G & E-H \end{vmatrix}. \quad \text{Equation 1}$$

The same gradient calculation may be applied to every 2×2 block of 2D data array 1005 in input frame 1002, hence generating an array of horizontal gradient values 1008 as well as an array of vertical gradient values 1010, both of which are supplied to a squaring circuit 1012. Based on these input gradient arrays, squaring circuit 1012 produces the following array outputs 1014, 1016 and 1018:

$$F_x^2 = F_x \cdot {}^* F_x$$

$$F_y^2 = F_y \cdot {}^* F_y, \quad \text{Equation 2}$$

$$F_x F_y = F_x \cdot {}^* F_u$$

where .* indicates a dot product operation. Each of the three outputs from Equation 2 is also a 2D data array having the same size as the gradient value arrays 1008 and 1010. These three output arrays 1014, 1016 and 1018 are then sent to 2D mean calculation module 1020 for further processing.

Two-dimensional mean calculation module 1020 operates by averaging the squared gradient values, on a block basis, of each input array 1014, 1016 and 1018 to generate a scalar average value per block of the arrays. For example, if a 2×2 block size is utilized, then the four gradient values in each block are averaged to yield a single scalar value. Consequently, three 2D arrays 1022, 1024 and 1026 of average square gradient values denoted as avg_$f_x^2$, avg_$f_y^2$, and avg_$f_x f_y$, are produced from module 1020. Each 2D array is adapted to contain all the scalar values for the entire image. These three average square gradient arrays may then be supplied to eigenvalue calculation module 1030 where two eigenvalues may be produced for each block of pixels in input frame 1002 based on the avg_$f_x^2$, avg_$f_y^2$, and avg_$f_x f_y$ arrays.

Figure 11:
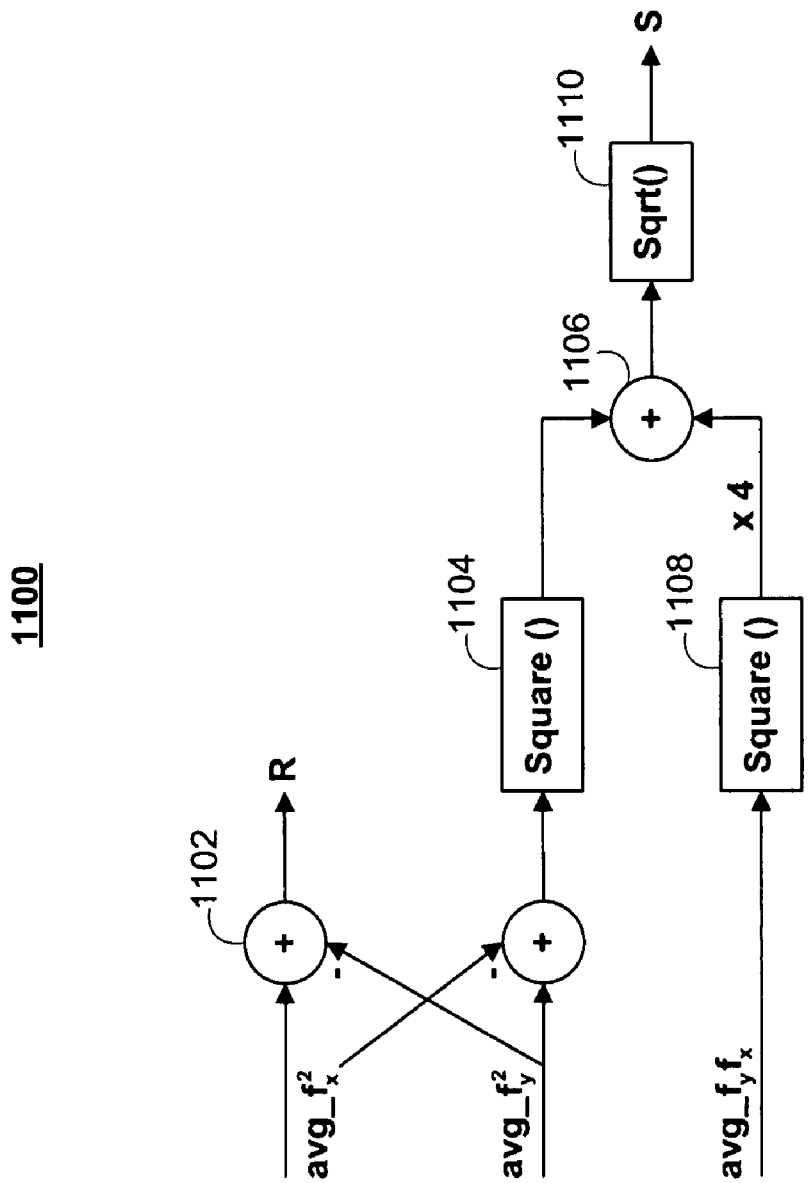
FIG. 11 is an illustrative block diagram of an eigenvalue calculation function of FIG. 10.

FIG. 11 provides an exemplary implementation 1100 of eigenvalue calculation module 1030 of FIG. 10. As illustrated, avg_$f_x^2$ array is subtracted from avg_$f_y^2$ array at adder 1102 to produce a difference matrix R. This difference matrix is then element-wise squared at operation 1104 and added to avg_$f_x f_y$ array at adder 1106 after avg_$f_x f_y$ array has undergone element-wise square operation 1108 and a factor of 4 multiplication. The resulting summation matrix 1106 is element-wise squared again at operation 1110 to produce a matrix S. Eigenvalue arrays $E_{v1}$ and $E_{v2}$ may then be computed as:

$$E_{v1} = 0.5 \cdot (R+S)$$

$$E_{v1} = 0.5 \cdot (R-S),$$

where each element in arrays $E_{v1}$ and $E_{v2}$ is an eigenvalue correlating to respect blocks of pixels of input image frame 1002 as illustrated in FIG. 10. These eigenvalues may be used to determine an object edge map for identifying those pixels having significant edge strengths and are, therefore, candidates for local motion estimation.

In the illustrated embodiment of FIGS. 10 and 11, a block size of 2×2 is employed for the computation of eigenvalues. However, it is possible to reduce hardware usage by utilizing a larger block size. It is also possible to increase estimation accuracy by utilizing a smaller block size. In additional, since each eigenvalue is positive, fractional, and varies from 0 to 1, using an 8-bit precision to represent the eigenvalues may provide sufficient accuracy from a numerical perspective. However, other precision values may also be used.

In summary, a segmentation mask computation process is described above with respect to FIGS. 8 and 9. The resulting segmentation mask may be used to identify those objects belonging to the foreground and background of an image frame. In addition, an object edge map generation process is described above respect to FIGS. 10 and 11. The resulting object edge map may be used to isolate those objects of a frame having significant edge strengths. The combination of a segmentation mask and an object edge map may thus be used to determine the appropriate correction techniques to be applied to sub-areas of an image frame so as to maximize both motion estimation accuracy and efficiency. In general, each block of pixels within a frame undergoes one of three types of motion compensations based on the block's foreground/background classification as well as its demonstrated edge strength. These three types are: global motion compensation, modified global motion compensation, and local motion compensation. Each block in the foreground is identified by a segmentation mask, such as the one generated in FIG. 9, and is subjected to either a local motion compensation or a modified global motion compensation as determined by an object edge map of the image frame. The blocks in the background of the frame, also identifiable using the segmentation mask, are subjected to a global motion compensation using the global affine parameters obtained in the processes of FIGS. 4-7. The details of this compensation type selection process as well as the local and modified global motion compensation techniques will be discussed below.

Figure 12:
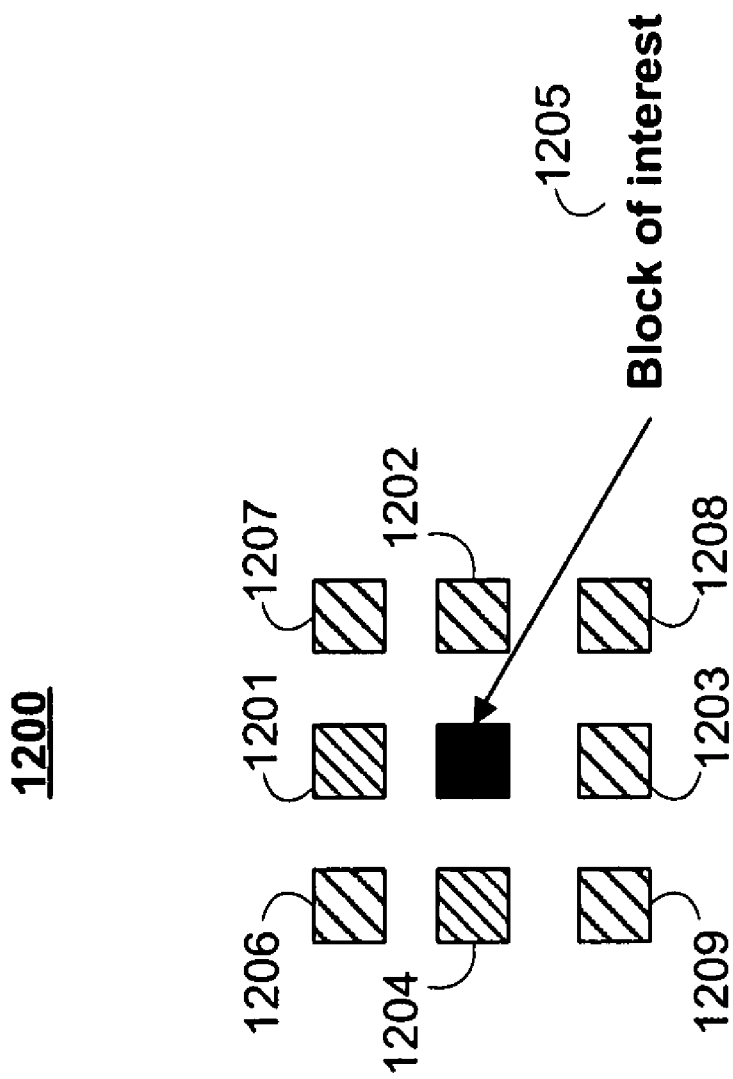
FIG. 12 is an illustrative approach for implementing a local motion compensation scheme and a modified global motion scheme.

FIG. 12 provides an illustrative embodiment of a technique utilized for the derivation of a local motion vector that captures the motion between two pixel blocks, where one block is in a reference frame and the other block is in a current frame. The pair of blocks may be detected based on their motion movements in contrast to the movements of their neighboring blocks. For example, motion detection may be based on the observation that the motion between the pair of correlating blocks may be in a different direction than the uniform global motion of its neighboring blocks. According to the illustrative embodiment of FIG. 12, center block 1205 of a 3×3 block arrangement 1200 is selected as a block of interest on a current frame for which its local motion vector is estimated. At a time t of the current frame processing, block 1205 has four neighboring blocks 1201-1209 situated north, east, south and west, respectively, from block 1205. In addition, the current frame has a temporally adjacent reference frame that is processed at time t−1 previous to the current frame. This reference frame includes a set of blocks having one-to-one correspondence to blocks 1201-1209 of the current frame. The motion vector of block 1205 in the current frame may then be approximated from the global motion vector computed at time t−1 for blocks 1201-1204 of the previous frame since it may be assumed that the motion of a center block deviates only slightly from that of its neighboring blocks. In the subsequent frame at time t+1, motion vector of each of blocks 1206-1209 is estimated from the motions of its north, south, west and east neighbors computed at time t. Hence motions values in a sequence of frames are successively refined based on their neighboring values with each temporal advancement of frames in the image sequence.

FIG. 12 may also be used to illustrate a modified global motion compensation scheme according to another aspect of the invention. This modified global motion compensation technique is likely to be used in a situation where global motion compensation is not sufficiently accurate for the estimation of a block's movement. Hence a small correction must be added to the global affine parameters to improve the resulting accuracy. Again referring to the illustrative embodiment of FIG. 12, center block 1205 of a 3×3 block arrangement 1200 is selected as a block of interest on a current frame with four neighboring blocks 1201-1209 situated north, east, south and west, respectively, from block 1205. A global motion compensated version of the current frame may be provided from which modified global motion compensation is determined. This global motion compensated current frame includes a set of blocks having one-to-one correspondence to blocks 1201-1209 of the current frame. The motion vector of block 1205 in the current frame may then be approximated from the global motion vector for blocks 1201-1204 of the corresponding global motion compensated frame. In particular, block 1205 is translated or motion shifted, by an incremental amount in all directions from a single uniform motion vector computed for each of its neighboring blocks 1201-1204 on the global motion compensated frame. The resulting best-matched vector becomes the final motion vector of block 1205. This incremental amount may be represented by a pair of correction parameters Xc and Yc, where Xc denotes a scalar shift in the horizontal global direction and Yc denotes a scalar shift in the vertical global direction.

In certain embodiments, the local motion estimation scheme is similar to the modified global motion compensation scheme except, in the former case, block compensation amount is determined based on a comparison of current and reference frames, whereas, in the latter case, this amount is determined from a comparison of the current frame with a global motion compensated version of the current frame. In certain implementations, the compensation amount is determined based on the motion vectors of those pixels within a pre-determined range from the block of interest, such as within a range of 3 blocks of pixels surrounding the block of interest.

A deciding advantage of using the neighborhood search algorithm for the computation of local motion and modified global motion vectors is that only a limited number of neighboring blocks per block of interest is searched. In addition, motion estimation derived and refined from those neighboring block values have been already computed in the previous frames. Hence these techniques greatly promote the efficiency of motion estimation.

Figure 13:
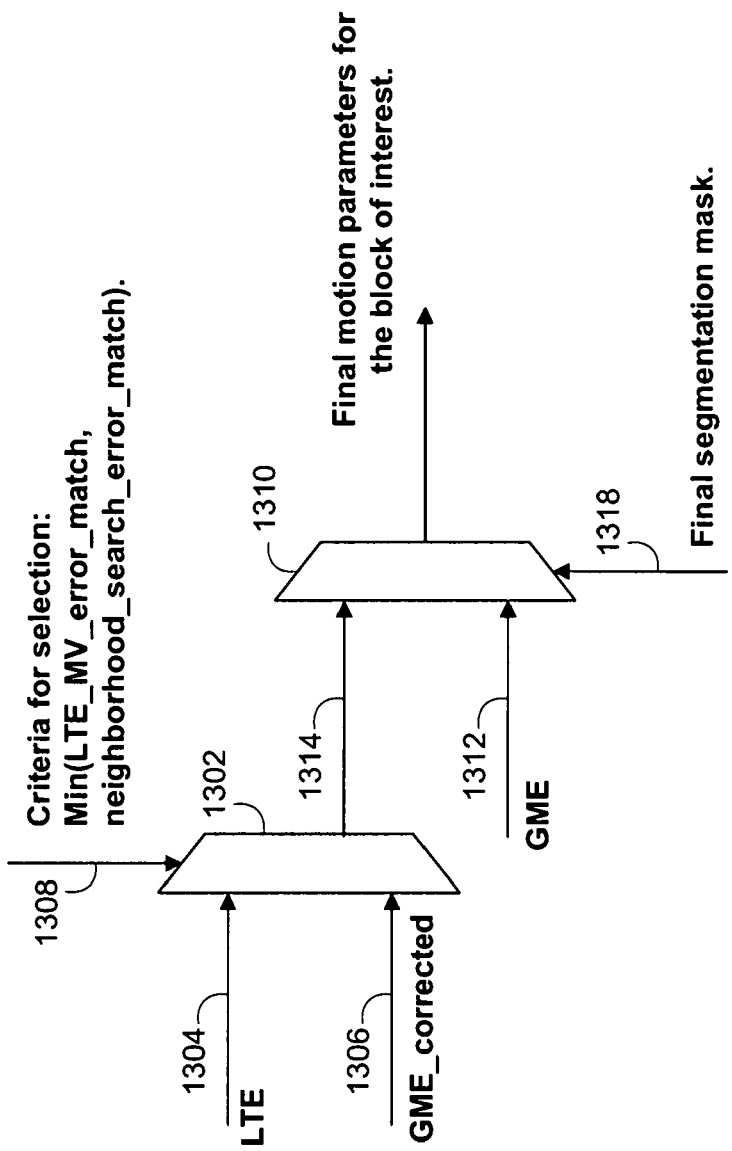
FIG. 13 is an illustrative flow diagram for selecting an appropriate motion compensation scheme to generate motion vectors between a pair of frames.

FIG. 13 provides a process for selecting which motion compensation scheme should be used for each block in the current frame. For example, multiplexer 1310 first selects between applying a global motion compensation scheme 1312 and a more refined compensation scheme 1314. This decision is made based on the utilization of a segmentation mask 1318 that distinguishes those foreground blocks in the frame from its background blocks. Global motion compensation 1312 is only applied to the background blocks. If a given block needs a more accurate form of correction, multiplexer 1302 makes a decision between applying a local motion compensation scheme 1304 and a modified global motion compensation scheme 1306 to that block. This decision is based on the smaller of the errors produced from using a local motion compensation approach 1304 and a modified global motion compensation approach 1306 to compensate such block. Hence, the final segmentation mask 1318 allows an appropriate motion compensation technique to be chosen for each block of interest, wherefrom a set of global, local, or modified global motion vectors may be computed for each block.

Figure 14:
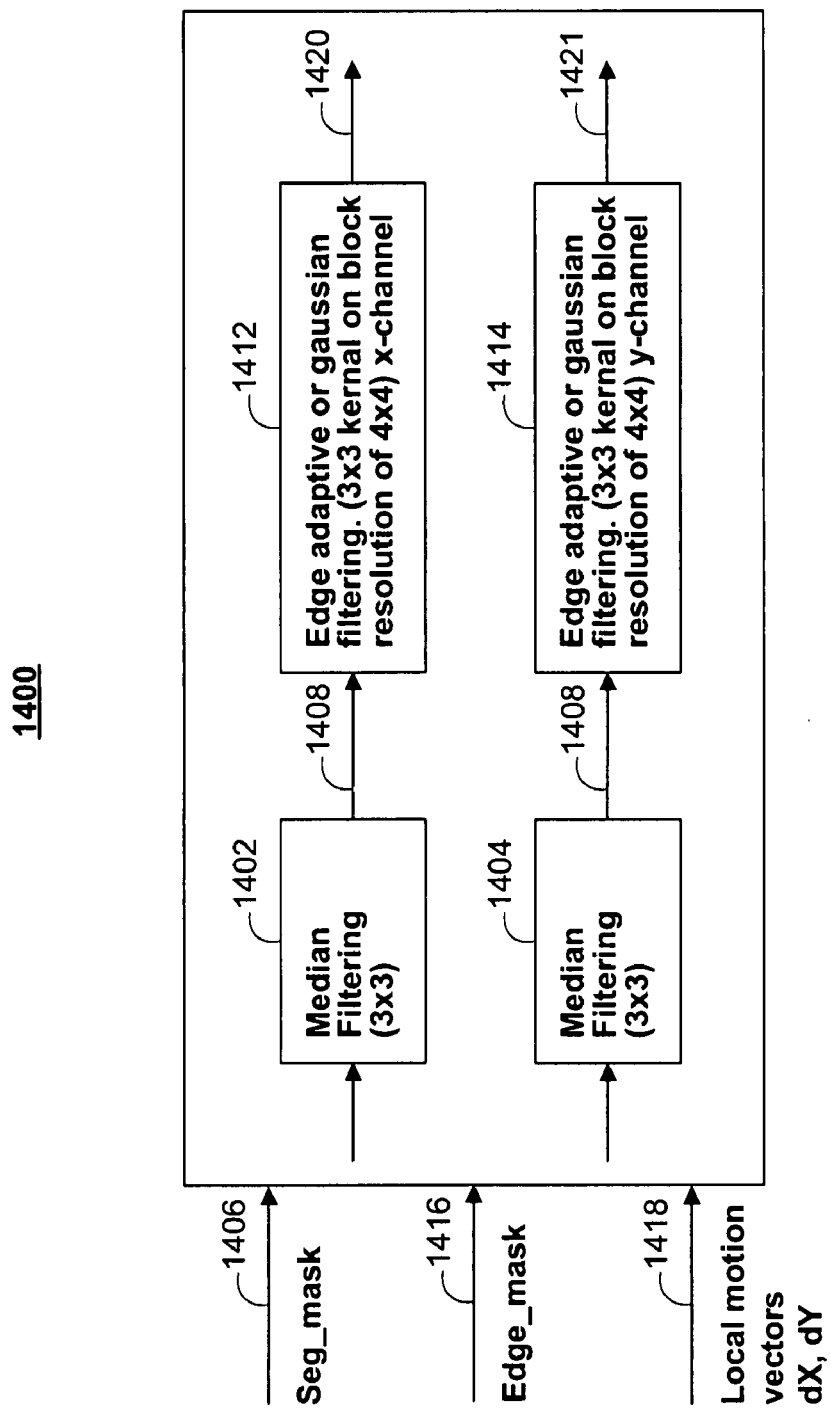
FIG. 14 is an illustrative block diagram for post-processing the local motion vectors computed from the procedure of FIG. 13.

According to another aspect of the invention as illustrated in FIG. 14, a post-processing procedure 1400 is provided to refine those local motion vectors 1418 obtained from the circuitry of FIG. 13. Local motion vectors in general are prone to noise as well as aperture effects. Hence a set of median filters 1402 and 1404 are applied to local vectors 1418 in both x- and y-directions of the vectors so as to minimize any adverse effects related to local corrections. A median filter operates on the premise that if all the neighboring blocks of an isolated local block move in a uniform direction vastly different from the movement of the isolated block, then the motion vector of the isolated block should be corrected so that it approximately conforms to the majority movement. An input segmentation mask 1406 is used in conjunction with median filters 1402 and 1404 to identify those isolated blocks. After median filtering, refined local motion vectors 1408 and 1410 in both the x- and y-directions are further processed by a set of edge adaptive or Gaussian filters 1412 and 1414 in each of the x- and y-directions. Gaussian filters 1412 and 1414 operate by smoothening local motion vectors 1408 and 1410, respectively, in both x- and y-directions, where the amount of smoothening applied to each vector component is decided by an input object edge map 1416 determined using the procedure described above with respect to FIGS. 10 and 11.

Figure 15:
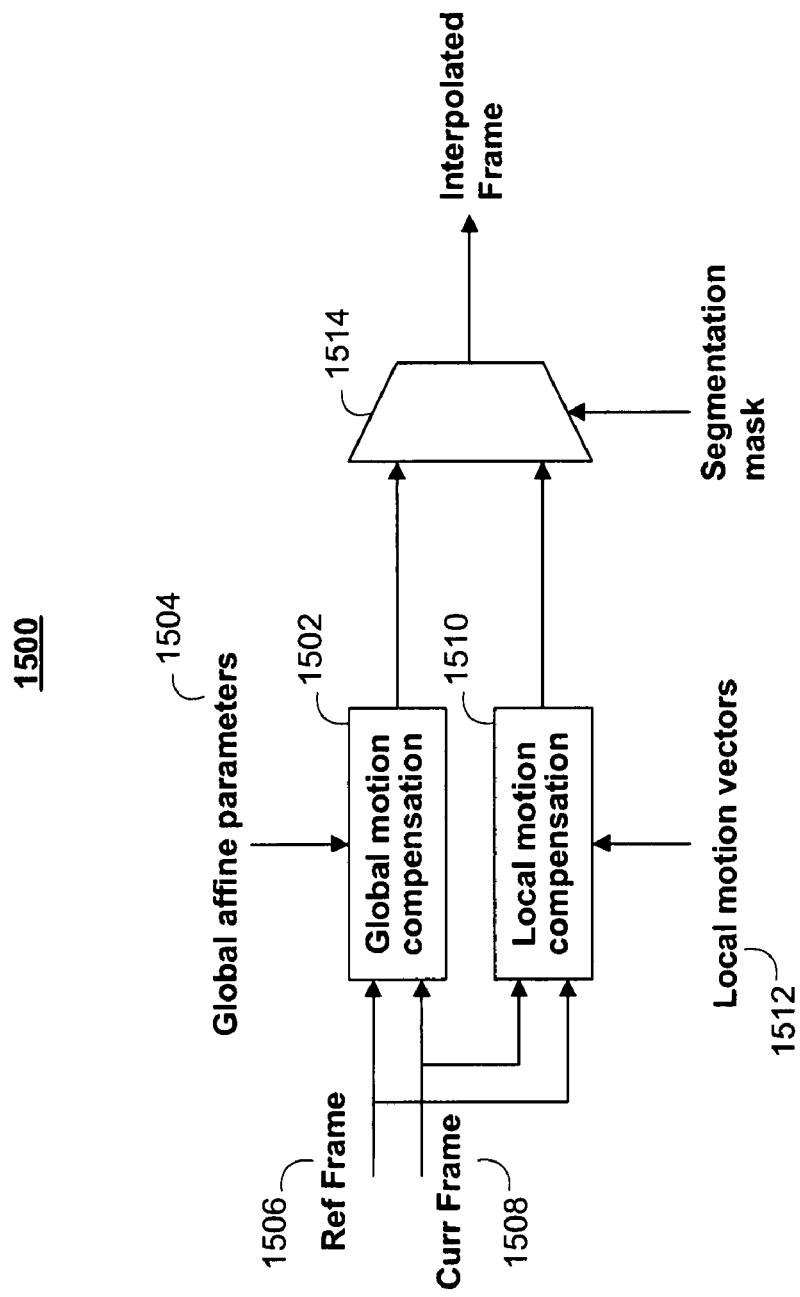
FIG. 15 is an illustrative block diagram of a motion-compensated interpolation function of FIG. 3.

In yet another aspect of the invention, a motion-compensated interpolation technique is used to estimate one or more intermediate frames between a pair of input reference and current frames. First, object motions between the pair of frames are characterized, on a block basis, by a set of motion vectors. The motion vectors are then used to interpolate the one or more intermediate frames so that they progressively capture motion trajectories between the frames. More specifically, as illustrated in FIG. 15, module 1502 is utilized to interpolate regions of the intermediate frames where global motion compensation is required. This type of motion-compensated interpolation is computed based on a set of pre-determined global affine parameters 1504 and a pair of reference 1506 and current input frames 1508. Module 1510 is utilized to interpolate regions of the intermediate frames where local motion compensation is necessary. This type of motion-compensated interpolation is accomplished based on a set of pre-determined input local motion vectors as well as the reference 1506 and current 1508 input frames. A segmentation mask 1514 may be used to determine whether each region of a frame should be globally or locally motion compensated during interpolation.

The illustrated embodiments are exemplary and do no limit the scope of the invention. The equations described herein as being implemented by various blocks in the disclosed communication system can be computed by hardware circuits and/or by software instructions running on a processor. The equation computations need not be performed with the exact terms and operations in the equations. For example, the equation computations can be performed using other terms and operations not shown in the equations to approximate the result of computing the equations. Thus, the various blocks in the communication system can perform computations based on the equations without directly computing the equations.

Referring now to FIGS. 16A-16E, various exemplary implementations of the present invention are shown.

Figure 16A:
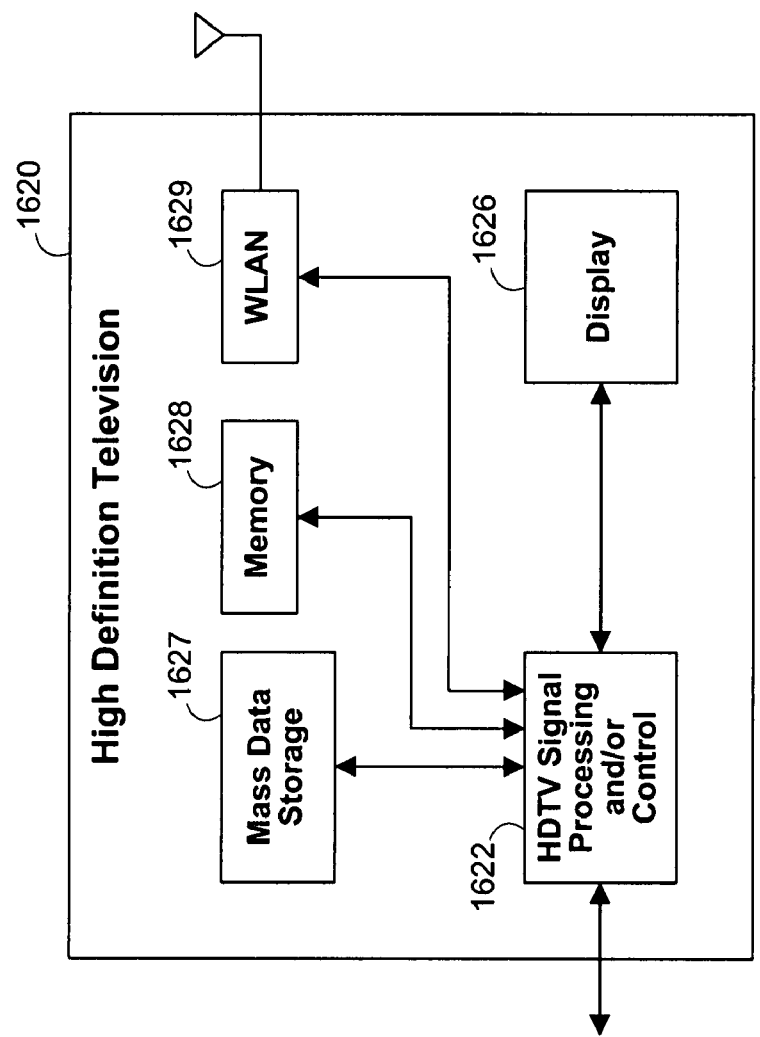
FIG. 16A is a block diagram of an exemplary high definition television that can employ the disclosed technology.

Referring now to FIG. 16A, the present invention can be implemented in a high definition television (HDTV) 1620. The present invention may implement either or both signal processing and/or control circuits, which are generally identified in FIG. 16A at 1622, a WLAN interface 1629 and/or mass data storage 1627 of the HDTV 1620. The HDTV 1620 receives HDTV input signals in either a wired or wireless format and generates HDTV output signals for a display 1626. In some implementations, signal processing circuit and/or control circuit 1622 and/or other circuits (not shown) of the HDTV 1620 may process data, perform coding and/or encryption, perform calculations, format data and/or perform any other type of HDTV processing that may be required.

The HDTV 1620 may communicate with mass data storage 1627 that stores data in a nonvolatile manner such as optical and/or magnetic storage devices including hard disk drives (HDDs) and digital versatile disk (DVD) drives. The HDD may be a mini HDD that includes one or more platters having a diameter that is smaller than approximately 1.8". The HDTV 1620 may be connected to memory 1628 such as RAM, ROM, low latency nonvolatile memory such as flash memory and/or other suitable electronic data storage. The HDTV 1620 also may support connections with a WLAN via the WLAN interface 1629.

Figure 16B:
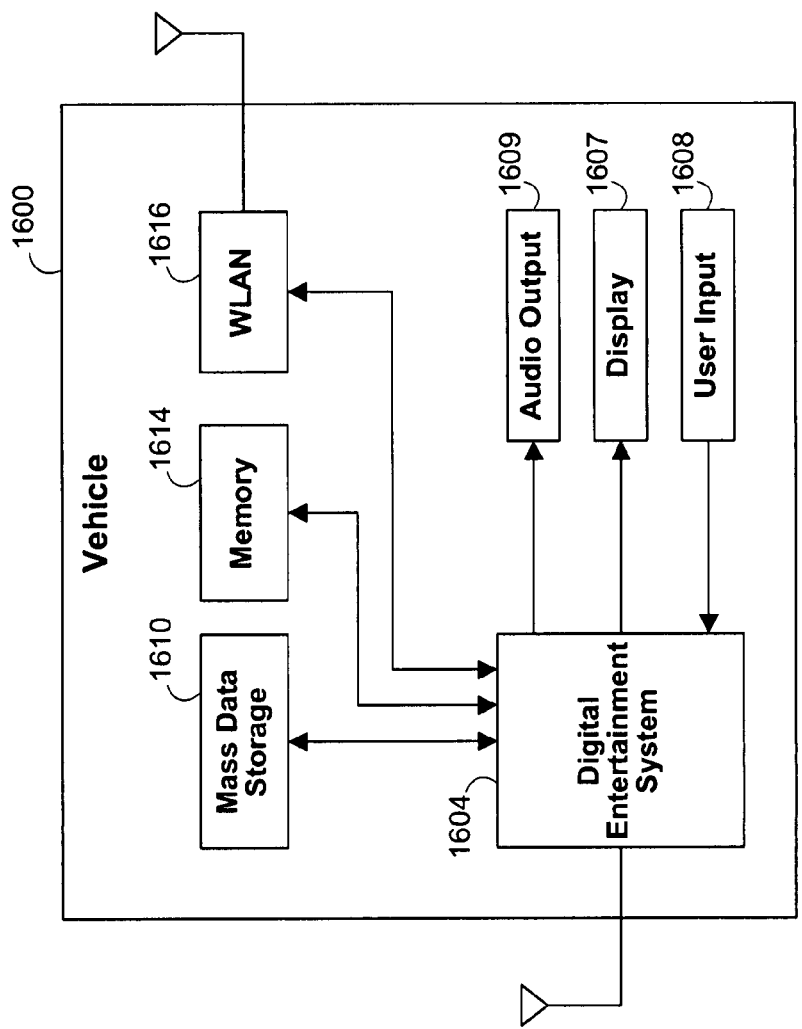
FIG. 16B is a block diagram of an exemplary vehicle that can employ the disclosed technology.

Referring now to FIG. 16B, the present invention may be implemented in a digital entertainment system 1604 of a vehicle 1600, which may include a WLAN interface 1616 and/or mass data storage 1610.

The digital entertainment system 1604 may communicate with mass data storage 1610 that stores data in a nonvolatile manner. The mass data storage 1610 may include optical and/or magnetic storage devices such as hard disk drives (HDDs) and/or DVD drives. The HDD may be a mini HDD that includes one or more platters having a diameter that is smaller than approximately 1.8". The digital entertainment system 1604 may be connected to memory 1614 such as RAM, ROM, low latency nonvolatile memory such as flash memory and/or other suitable electronic data storage. The digital entertainment system 1604 also may support connections with a WLAN via the WLAN interface 1616.

Figure 16C:
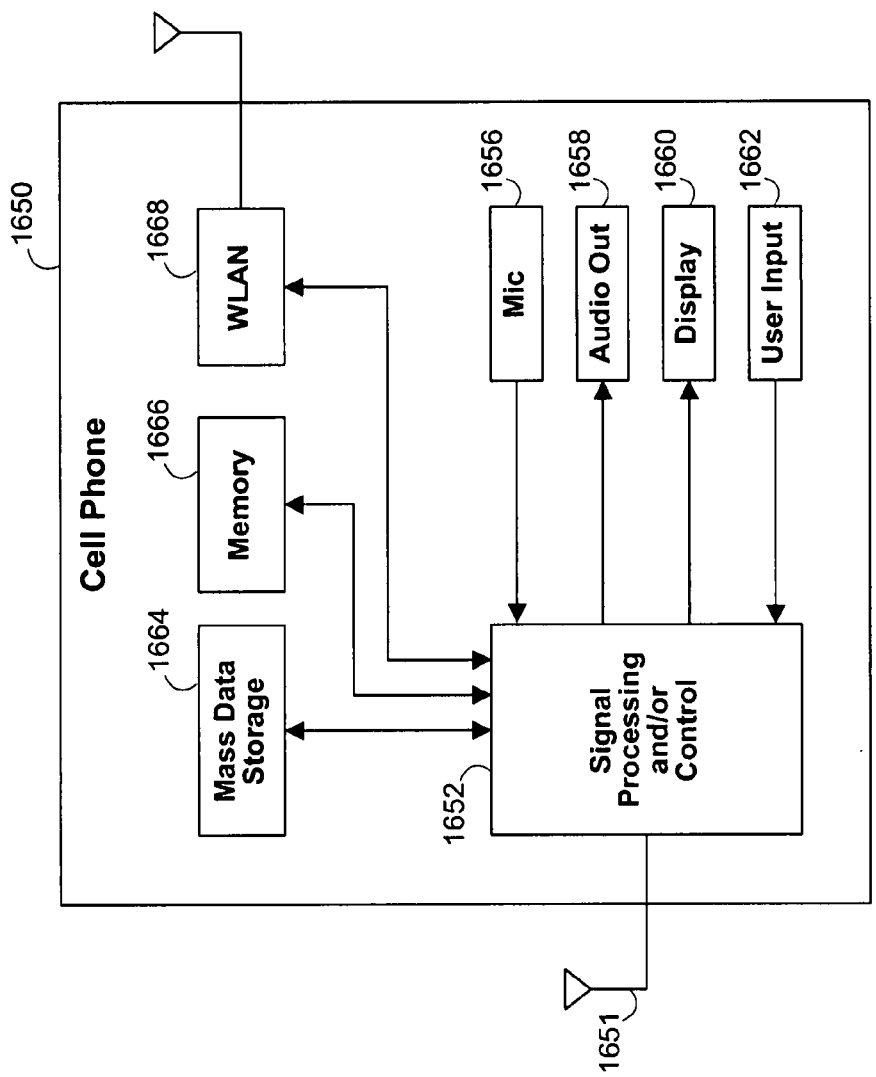
FIG. 16C is a block diagram of an exemplary cell phone that can employ the disclosed technology.

Referring now to FIG. 16C, the present invention can be implemented in a cellular phone 1650 that may include a cellular antenna 1651. The present invention may implement either or both signal processing and/or control circuits, which are generally identified in FIG. 16C at 1652, a WLAN interface 1668 and/or mass data storage 1664 of the cellular phone 1650. In some implementations, the cellular phone 1650 includes a microphone 1656, an audio output 1658 such as a speaker and/or audio output jack, a display 1660 and/or an input device 1662 such as a keypad, pointing device, voice actuation and/or other input device. The signal processing and/or control circuits 1652 and/or other circuits (not shown) in the cellular phone 1650 may process data, perform coding and/or encryption, perform calculations, format data and/or perform other cellular phone functions.

The cellular phone 1650 may communicate with mass data storage 1664 that stores data in a nonvolatile manner such as optical and/or magnetic storage devices including hard disk drives (HDDs) and/or DVD drives. The HDD may be a mini HDD that includes one or more platters having a diameter that is smaller than approximately 1.8". The cellular phone 1650 may be connected to memory 1666 such as RAM, ROM, low latency nonvolatile memory such as flash memory and/or other suitable electronic data storage. The cellular phone 1650 also may support connections with a WLAN via the WLAN interface 1668.

Figure 16D:
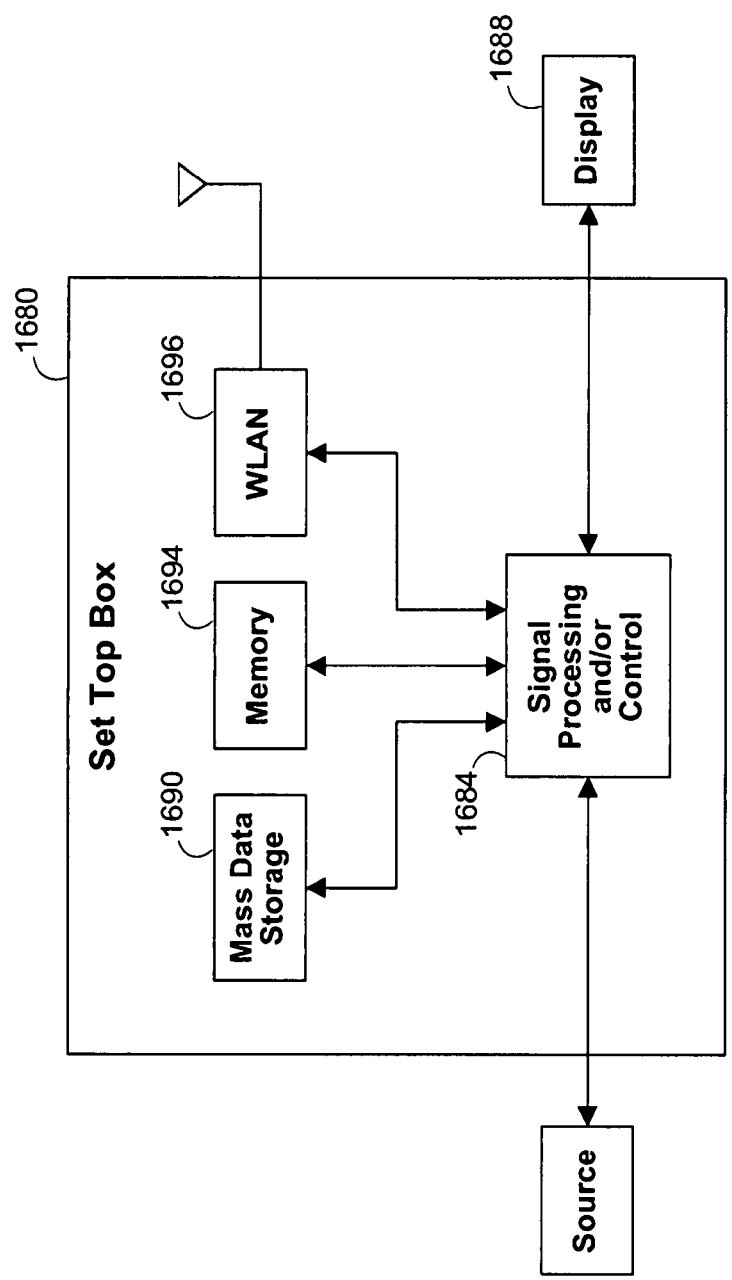
FIG. 16D is a block diagram of an exemplary set top box that can employ the disclosed technology.

Referring now to FIG. 16D, the present invention can be implemented in a set top box 1680. The present invention may implement either or both signal processing and/or control circuits, which are generally identified in FIG. 16D at 1684, a WLAN interface 1696 and/or mass data storage 1690 of the set top box 1680. The set top box 1680 receives signals from a source such as a broadband source and outputs standard and/or high definition audio/video signals suitable for a display 1688 such as a television via monitor and/or other video and/or audio output devices. The signal processing and/or control circuits 1684 and/or other circuits (not shown) of the set top box 1680 may process data, perform coding and/or encryption, perform calculations, format data and/or perform any other set top box function.

The set top box 1680 may communicate with mass data storage 1690 that stores data in a nonvolatile manner. The mass data storage 1690 may include optical and/or magnetic storage devices such as hard disk drives (HDDs) and/or DVD drives. The HDD may be a mini HDD that includes one or more platters having a diameter that is smaller than approximately 1.8". The set top box 1680 may be connected to memory 1694 such as RAM, ROM, low latency nonvolatile memory such as flash memory and/or other suitable electronic data storage. The set top box 1680 also may support connections with a WLAN via the WLAN network 1696.

Figure 16E:
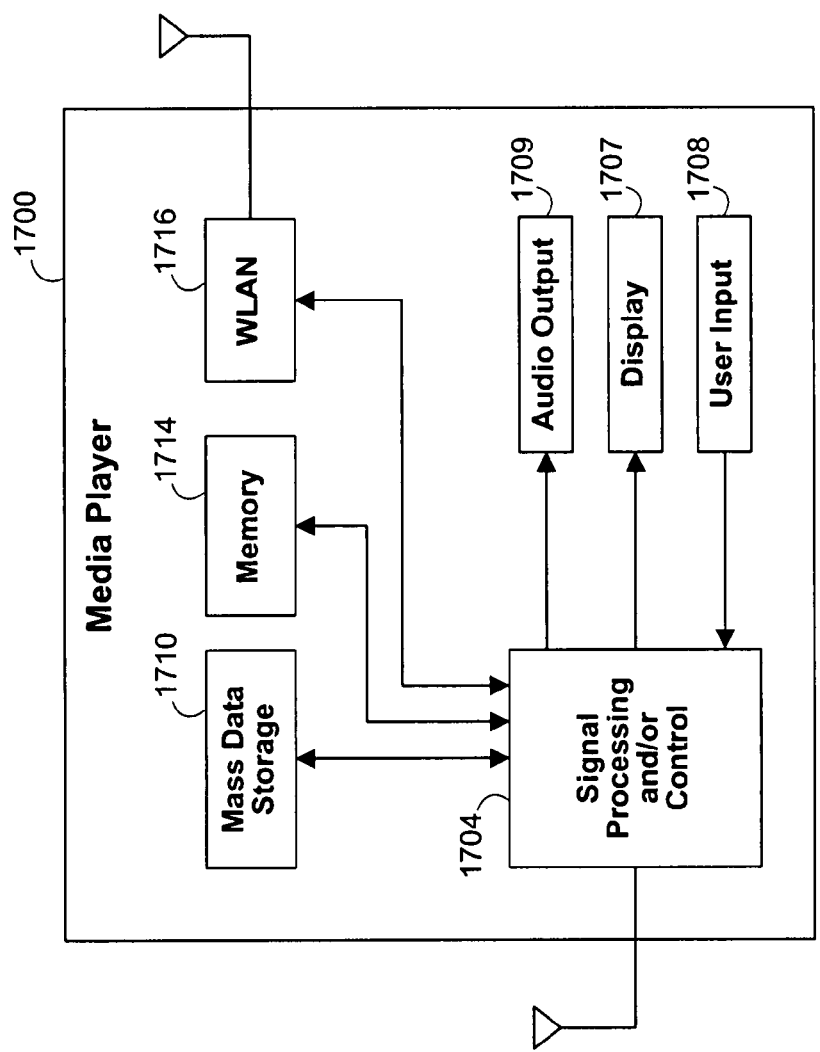
FIG. 16E is a block diagram of an exemplary media player that can employ the disclosed technology.

Referring now to FIG. 16E, the present invention can be implemented in a media player 1700. The present invention may implement either or both signal processing and/or control circuits, which are generally identified in FIG. 16E at 1704, a WLAN interface 1716 and/or mass data storage 1710 of the media player 1700. In some implementations, the media player 1700 includes a display 1707 and/or a user input 1708 such as a keypad, touchpad and the like. In some implementations, the media player 1700 may employ a graphical user interface (GUI) that typically employs menus, drop down menus, icons and/or a point-and-click interface via the display 1707 and/or user input 1708. The media player 1700 further includes an audio output 1709 such as a speaker and/or audio output jack. The signal processing and/or control circuits 1704 and/or other circuits (not shown) of the media player 1700 may process data, perform coding and/or encryption, perform calculations, format data and/or perform any other media player function.

The media player 1700 may communicate with mass data storage 1710 that stores data such as compressed audio and/or video content in a nonvolatile manner. In some implementations, the compressed audio files include files that are compliant with MP3 format or other suitable compressed audio and/or video formats. The mass data storage 1710 may include optical and/or magnetic storage devices such as hard disk drives (HDDs) and/or DVD drives. The HDD may be a mini HDD that includes one or more platters having a diameter that is smaller than approximately 1.8". The media player 1700 may be connected to memory 1714 such as RAM, ROM, low latency nonvolatile memory such as flash memory and/or other suitable electronic data storage. The media player 1700 also may support connections with a WLAN via the WLAN interface 1716. Still other implementations in addition to those described above are contemplated.

Thus it is seen that systems and methods for a motion compensated picture rate converter is provided that includes various techniques for efficiently and accurately interpolate motion-compensated frames from a sequence of input frames. One skilled in the art will appreciate that the invention can be practiced by other than the described embodiments, which are presented for purposes of illustration and not of limitation, and the present invention is limited only by the claims which follow.

What is claimed is:

1. A method for applying motion estimation, the method comprising:
    receiving an input signal having at least a current frame and a reference frame;
    estimating global motion between the reference frame and the current frame to generate at least one affine motion parameter;
    estimating local motion between the reference frame and the current frame to generate at least one motion vector, wherein
    the at least one affine motion parameter estimates the global motion of a first region between the reference frame and the current frame, and the at least one motion vector estimates a local motion in a second region between the reference frame and the current frame;
    identifying neighboring areas adjacent to the second region of the reference frame; and
    generating a modified global motion vector by modifying the at least one motion vector of the second region using affine motion parameters corresponding to the adjacent neighboring areas.

2. The method of claim 1, further comprising:
    generating at least one coarse affine parameter; and
    refining the at least one coarse affine parameter to generate the at least one affine motion parameter.

3. The method claim 1, wherein the first region is a background region of the current frame, and the at least one affine motion parameter is used to compensate motion of the first region.

4. The method of claim 1, further comprising:
    generating the at least one motion vector of the second region of the current frame using motion vectors for the neighboring areas computed for the reference frame, wherein
    the at least one motion vector is a local motion vector.

5. The method of claim 1, wherein the second region is determined by at least one of a segmentation mask and an object edge strength map applied to the current frame.

6. The method of claim 1, wherein one of a modified global motion vector and a local motion vector is used to compensate motion in the second region based on a smaller one of errors produced from applying the modified global motion vector and the local motion vector.

7. A method for performing global motion estimation, the method comprising:
    receiving an input signal having at least a current frame and a reference frame;
    phase-correlating the current frame and the reference frame; and
    computing at least one affine parameter for estimating a global translation motion between the current frame and the reference frame based on the phase correlation.

8. The method of claim 7, wherein phase-correlating the current frame and the reference frame comprises:
    decimating respective ones of the current and reference frames by a decimation factor;
    Fourier transforming the decimated current and reference frames;
    subtracting phases correlating to the transformed current frame from phases correlating to the transformed reference frame to generate a phase difference array; and
    inverse Fourier transforming an exponential of the phase difference array to generate a correlation surface.

9. The method of claim 8, wherein the decimation factor is one of 1, 4, and 9.

10. The method of claim 8, wherein a maximum value of the correlation surface and a location of the maximum value on the correlation surface are used to compute the at least one affine parameter.

11. The method of claim 7, further comprising:
    updating the reference frame using the at least one affine parameter;
    obtaining a difference between the updated reference frame and the current frame; and
    refining the at least one affine parameter to minimize the difference.

12. A method for generating at least one motion vector for an interest area of a current frame in relation to a reference frame, the method comprising:
    providing at least one affine parameter for estimating a global motion between the current frame and the reference frame;
    generating a segmentation mask based on the at least one affine parameter for identifying foreground and background regions of the current frame;
    generating an object edge strength map for identifying regions of significant edge strengths in the current frame; and
    computing the at least one motion vector for the interest area based on the foreground, background and significant edge strength regions in relation to the interest area.

13. The method of claim 12, wherein computing the at least one motion vector comprises computing at least one of a global motion vector, a modified global motion vector and a local motion vector.

14. The method of claim 12, wherein generating the segmentation mask comprises:
    updating the reference frame using the at least one affine parameter;
    obtaining a difference frame between the updated reference frame and the current frame; and
    comparing each region of the difference frame to a first threshold for classifying the region into one of the foreground and the background regions.

15. The method of claim 14, further comprising:
    determining an object having at least two connected regions in the segmentation mask;
    quantifying an area occupied by the object; and
    comparing the quantified area to a second threshold to re-classify each of the at least two connected regions into one of the foreground and background regions.

16. The method of claim 12, wherein generating an object edge strength map comprises:
    generating a plurality of eigenvalues correlating to vertical and horizontal directions of sub-areas in the current frame; and
    determining a maximum of the eigenvalues, wherein each of the sub-areas having eigenvalues approximately within a range defined by the maximum is adapted to be a region of significant edge strength.

17. The method of claim 12, further comprising applying at least one of a median filtering, an edge adaptive filtering and a Gaussian filtering to the motion vector corresponding to the interest area, wherein the interest area is selected from a combination of the segmentation mask and the object edge strength map applied to the current frame.

18. The method of claim 12, further comprising using the at least one motion vector to produce a motion-compensated frame interpolated between the current frame and the reference frame.

19. A method for performing motion compensated frame rate conversion, the method comprising:
   receiving an input signal having at least a current frame and a reference frame;
   processing the current frame and the reference frame, wherein the processing comprises:
      identifying neighboring areas adjacent to a region of the reference frame, and
      generating a local motion vector of a region of the current frame using motion vectors of the adjacent neighboring areas;
   providing at least one of an affine global motion parameter and the local motion vector that characterize respective global and local motions between the processed current frame and the processed reference frame; and
   enabling motion compensated interpolation, wherein the motion compensated interpolation generates at least one interpolated frame between the processed current frame and the processed reference frame using at least one of the affine global motion parameter and the local motion vector.

20. The method of claim 19, further comprising post processing an output signal of the motion compensated interpolation, wherein
   the output signal has a frame rate that is faster than a native frame rate of the input signal.

21. The method of claim 19, further comprising post processing the processed current frame and the processed reference frame to generate a signal for undergoing the motion compensated interpolation, wherein
   the signal is adapted to have a frame rate about equal to a native frame rate of the input signal.

22. The method of claim 19, wherein processing the current frame and the reference frame comprises performing at least one of noise reduction and de-interlacing of the current frame and the reference frame.

23. A motion compensated frame rate converter comprising:
   circuitry for receiving an input signal having at least a current frame and a reference frame;
   a global affine motion estimation module for estimating global motion between the reference frame and the current frame to generate at least one affine motion parameter;
   a local motion correction module for estimating local motion between the reference frame and the current frame to generate at least one motion vector, wherein the at least one affine motion parameter estimates the global motion of a first region between the reference frame and the current frame, and the at least one motion vector estimates a local motion in a second region between the reference frame and the current frame;
   circuitry for identifying neighboring areas adjacent to the second region of the reference frame; and
   a modified global motion estimation module for generating a modified global motion vector by modifying the at least one motion vector of the second region using affine motion parameters corresponding to the adjacent neighboring areas.

24. The motion compensated frame rate converter of claim 23, wherein the global affine motion estimation module comprising:
   a global translation estimate and affine prediction module for generating at least one coarse affine parameter; and
   an affine-parameter refinement module for refining the at least one coarse affine parameter to generate the at least one affine motion parameter.

25. The motion compensated frame rate converter of claim 23, wherein the affine-parameter refinement module uses a RANSAC-based refinement scheme.

26. The motion compensated frame rate converter of claim 23, wherein the first region is a background region of the current frame, and the at least one affine motion parameter is used to compensate motion in the first region.

27. The motion compensated frame rate converter of claim 23, wherein the local motion correction module comprises:
   a local motion estimation module for generating the at least one motion vector of the second region of the current frame using motion vectors for the neighboring areas computed for the reference frame, wherein
   the at least one motion vector is a local motion vector.

28. The motion compensated frame rate converter of claim 23, wherein the second region is determined based on applying at least one of a segmentation mask and an object edge strength map to the current frame.

29. The motion compensated frame rate converter of claim 23, wherein one of a modified global motion vector and a local motion vector is used to compensate motion in the second region based on a smaller one of errors produced from applying the modified global motion vector and the local motion vector.

30. The motion compensated frame rate converter of claim 23, wherein the motion compensated frame rate converter is provided inside of a motion compensated picture rate converter for processing an input signal having a sequence of frames.

31. A global translation estimation module comprising:
   circuitry for receiving an input signal having at least a current frame and a reference frame;
   a phase correlation module for phase correlating the current frame and the reference frame; and
   circuitry for computing at least one affine parameter that estimates a global translation motion between the current frame and the reference frame based on the phase correlation.

32. The global translation estimation module of claim 31 comprises:
   circuitry for decimating respective ones of the current and reference frames by a decimation factor;
   circuitry for Fourier transforming the decimated current and reference frames;
   circuitry for subtracting phases correlating to the transformed current frame from phases correlating to the transformed reference frame to generate a phase difference array; and
   circuitry for inverse Fourier transforming an exponential of the phase difference array to generate a correlation surface.

33. The global translation estimation module of claim 32, further comprising circuitry for determining a maximum value of the correlation surface and a location of the maximum value on the correlation surface, wherein the maximum value and the location of the maximum value are used to compute the at least one affine parameter.

34. The global translation estimation module of claim 32, wherein the decimation factor is one of 1, 4, and 9.

35. The global translation estimation module of claim 31, wherein the at least one affine parameter is provided to an affine-parameter refinement module coupled to the global translation estimation module, and the affine-parameter refinement module comprises:
   circuitry for updating the reference frame based on the at least one affine parameter, circuitry for obtaining a difference between the updated reference frame and the current frame, and circuitry for refining the at least one affine parameter to minimize the difference.

36. A local motion correction module, comprising:
a segmentation mask for identifying foreground and background regions of a current frame;
an object edge strength map for identifying regions of significant edge strengths in the current frame; and
circuitry for computing at least one motion vector for an interest area based on the foreground, background and significant edge strength regions in relation to the interest area.

37. The local motion correction module of claim 36, wherein circuitry for computing the at least one motion vector comprises circuitry for computing at least one of a modified global motion vector and a local motion vector for the interest area.

38. The local motion correction module of claim 36, wherein the segmentation mask is generated by circuitry comprises:
circuitry for updating the reference frame using at least one affine parameter that characterizes a global motion between the current frame and the reference frame;
circuitry for obtaining a difference frame between the updated reference frame and the current frame; and
circuitry for comparing each region of the difference frame to a first threshold for classifying the region into one of the foreground and the background regions.

39. The local motion correction module of claim 38, wherein the segmentation mask is further generated by circuitry comprises:
circuitry for determining an object having at least two connected regions in the segmentation mask;
circuitry for quantifying an area occupied by the object; and
circuitry for comparing the quantified area to a second threshold to re-classify each of the at least two connected regions into one of the foreground and background regions.

40. The local motion correction module of claim 36, wherein the object edge strength map is generated by circuitry comprises:
circuitry for generating a plurality of eigenvalues correlating to vertical and horizontal directions of sub-areas in the current frame; and
circuitry for determining a maximum of the eigenvalues, wherein each of the sub-areas having eigenvalues approximately within a range defined by the maximum is adapted to be a region of significant edge strength.

41. The local motion correction module of claim 36, wherein at least one of a median filter, an edge adaptive filter and a Gaussian filter is used to filter the motion vector corresponding to the interest area, wherein the interest area is selected from a combination of the segmentation mask and the object edge strength map applied to the current frame.

42. The local motion correction module of claim 36, wherein the at least one motion vector is used to produce a motion-compensated frame interpolated between the current frame and the reference frame.

43. A motion compensated picture rate converter, comprising:
circuitry for receiving an input signal having at least a reference frame and a current frame;
a processing module for processing the reference frame and the current frame, wherein the processing comprises:

identifying neighboring areas adjacent to a region of the reference frame, and
generating a local motion vector of a region of the current frame using motion vectors of the adjacent neighboring areas; and
a motion compensated frame rate converter including:
circuitry for providing at least one of an affine global motion parameter and a motion vector that characterize respective global and local motions between the processed current frame and the processed reference frame, and
motion compensated interpolation circuitry for generating at least one interpolated frame between the processed current frame and the processed reference frame using at least one of the affine global motion parameter and the motion vector.

44. The motion compensated picture rate converter of claim 43, further comprising a post processing module for processing an output signal of the motion compensated frame rate converter, wherein
the output signal has a frame rate that is higher than a native frame rate of the input signal.

45. The motion compensated picture rate converter of claim 43, further comprising a post processing module that processes the processed current frame and the processed reference frame to generate a signal for supplying to the motion compensated frame rate converter, wherein
the signal is adapted to have a frame rate about equal to a native frame rate of the input signal.

46. The motion compensated picture rate converter of claim 43, wherein the processing module comprises circuitry for performing at least one of noise reduction and de-interlacing of the current frame and the reference frame.

47. A motion compensated frame rate converter comprising:
means for receiving an input signal having at least a reference frame and a current frame;
means for estimating global motion between the reference frame and the current frame to generate at least one affine motion parameter;
means for estimating local motion between the reference frame and the current frame to generate at least one motion vector, wherein
the at least one affine motion parameter estimates the global motion of a first region between the reference frame and the current frame, and the at least one motion vector estimates a local motion in a second region between the reference frame and the current frame;
means for identifying neighboring areas adjacent to the second region of the reference frame; and
means for generating a modified global motion vector by modifying the at least one motion vector of the second region using affine motion parameters corresponding to the adjacent neighboring areas.

48. The motion compensated frame rate converter of claim 47, wherein means for estimating global motion between the reference frame and the current frame further comprising:
means for generating at least one coarse affine parameter; and
means for refining the at least one coarse affine parameter to generate the at least one affine motion parameter.

49. The motion compensated frame rate converter of claim 48, wherein means for refining the at least one coarse affine parameter comprises a RANSAC-based refinement scheme.

50. The motion compensated frame rate converter of claim 47, wherein the first region is a background region of the current frame, and the at least one affine motion parameter is used to compensate motion in the first region.

51. The motion compensated frame rate converter of claim 47, wherein means for estimating local motion between the reference frame and the current frame comprises:
means for generating the at least one motion vector of the second region of the current frame using motion vectors for the neighboring areas computed for the reference frame, wherein
the at least one motion vector is a local motion vector.

52. The motion compensated frame rate converter of claim 47, further comprising means for determining the second region based on means for applying at least one of a segmentation mask and an object edge strength map to the current frame.

53. The motion compensated frame rate converter of claim 47, further comprising means for compensating the motion in the second region using one of a modified global motion vector and a local motion vector based on a smaller one of errors produced from applying the modified global motion vector and the local motion vector.

54. A global translation estimation module comprising:
means for receiving an input signal having at least a current frame and a reference frame;
means for phase correlating the current frame and the reference frame; and
means for computing at least one affine parameter for estimating a global translation motion between the current frame and the reference frame based on the phase correlation.

55. The global translation estimation module of claim 54, wherein means for phase correlating the current frame and the reference frame further comprising:
means for decimating respective ones of the current and reference frames by a decimation factor;
means for Fourier transforming the decimated current and reference frames;
means for subtracting phases correlating to the transformed current frame from phases correlating to the transformed reference frame to generate a phase difference array; and
means for inverse Fourier transforming an exponential of the phase difference array to generate a correlation surface.

56. The global translation estimation module of claim 55, further comprising means for determining a maximum value of the correlation surface and a location of the maximum value on the correlation surface, wherein the maximum vale and the location of the maximum value are used to compute the at least one affine parameter.

57. The global translation estimation module of claim 56, wherein the decimation factor is one of 1, 4, and 9.

58. The global translation estimation module of claim 56, wherein the at least one affine parameter is provided to an affine-parameter refinement module coupled to the global translation estimation module, wherein the affine-parameter refinement module comprises:
means for updating the reference frame based on the at least one affine parameter,
means for obtaining a difference between the updated reference frame and the current frame, and
means for refining the at least one affine parameter to minimize the difference.

59. A local motion correction module, comprising:
means for producing a segmentation mask for identifying foreground and the background regions of a current frame;
means for producing an object edge strength map for identifying regions of significant edge strengths in the current frame; and
means for computing at least one motion vector for an interest area based on the foreground, background and significant edge strength regions in relation to the interest area.

60. The local motion correction module of claim 59, wherein means for computing the at least one motion vector comprises means for computing at least one of a modified global motion vector and a local motion vector for the interest area.

61. The local motion correction module of claim 59, wherein means for generating the segmentation mask includes:
means for updating the reference frame using at least one affine parameter that characterizes a global motion between the current frame and the reference frame;
means for obtaining a difference frame between the updated reference frame and the current frame; and
means for comparing each region of the difference frame to a first threshold for classifying the region into one of the foreground and background regions.

62. The local motion correction module of claim 61, wherein means for producing the segmentation mask further includes:
means for determining an object having at least two connected regions in the segmentation mask;
means for quantifying an area occupied by the object; and
means for comparing the quantified area to a second threshold to re-classify each of the at least two connected regions into one of the foreground and background regions.

63. The local motion correction module of claim 59, wherein means for producing the object edge strength includes:
means for generating a plurality of eigenvalues correlating to vertical and horizontal directions of sub-areas in the current frame; and
means for determining a maximum of the eigenvalues, wherein each of the sub-areas having eigenvalues approximately within a range defined by the maximum is a region of significant edge strength.

64. The local motion correction module of claim 59, wherein at least one of a median filter means, an edge adaptive filter means and a Gaussian filter means is used to filter the motion vector corresponding to the interest area, wherein the interest area is selected from a combination of the segmentation mask and the object edge strength map applied to the current frame.

65. The local motion correction module of claim 59, wherein the at least one motion vector is used to produce a motion-compensated frame interpolated between the current frame and the reference frame.

66. A motion compensated picture rate converter, comprising:
means for receiving an input signal having at least a current frame and a reference frame;
means for processing the current frame and the reference frame, wherein the processing comprises:
identifying neighboring areas adjacent to a region of the reference frame, and
generating a local motion vector of a region of the current frame using motion vectors of the adjacent neighboring areas;
means for providing at least one of an affine global motion parameter and a motion vector characterizing respective global and local motions between the processed current frame and the processed reference frame; and means for enabling motion compensated interpolation, wherein the motion compensated interpolation generates at least one interpolated frame between the processed current frame and the processed reference frame using at least one of the affine global motion parameter and the motion vector.

67. The motion compensated picture rate converter of claim 66, further comprising means for post-processing an output signal from the means for enabling motion compensated interpolation, wherein the output signal has a frame rate that is faster than a native frame rate of the input signal.

68. The motion compensated picture rate converter of claim 66, further comprising means for post-processing the processed current frame and the processed reference frame to generate a signal for supplying to the means for enabling motion compensated interpolation, wherein the signal is adapted to have a frame rate about equal to a native frame rate of the input signal.

69. The motion compensated picture rate converter of claim 66, wherein the means for processing the current frame and the reference frame comprises means for performing at least one of noise reduction and de-interlacing of the current frame and the reference frame.

\* \* \* \* \*